US012812602B2

(12) United States Patent
Selvanesan et al.

(10) Patent No.: US 12,812,602 B2
(45) Date of Patent: Nov. 24, 2026

(54) NR SIDELINK ASSISTANCE INFORMATION MESSAGES

(71) Applicant: Fraunhofer-Gesellschaft zur Foerderung der angewandten Forschung e.V., Munich (DE)

(72) Inventors: Sarun Selvanesan, Berlin (DE); Baris Goektepe, Berlin (DE); Thomas Fehrenbach, Berlin (DE); Thomas Wirth, Berlin (DE); Thomas Schierl, Berlin (DE); Cornelius Hellge, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 424 days.

(21) Appl. No.: 17/947,821

(22) Filed: Sep. 19, 2022

(65) Prior Publication Data

US 2023/0081131 A1 Mar. 16, 2023

Related U.S. Application Data

(63) Continuation of application No. PCT/EP2021/056932, filed on Mar. 18, 2021.

(30) Foreign Application Priority Data

Mar. 20, 2020 (EP) .................................... 20164706

(51) Int. Cl.
*H04W 72/02* (2009.01)
*H04W 72/20* (2023.01)

(52) U.S. Cl.
CPC .......... *H04W 72/02* (2013.01); *H04W 72/20* (2023.01)

(58) Field of Classification Search
None
See application file for complete search history.

(56) References Cited

U.S. PATENT DOCUMENTS 11,582,721 B2 * 2/2023 Balasubramanian ........................ H04L 5/0053
2020/0322024 A1 * 10/2020 Cheng .................. H04W 76/11
(Continued)

FOREIGN PATENT DOCUMENTS

EP 3821658 A1 5/2021
WO 2019192701 A1 10/2019
(Continued)

OTHER PUBLICATIONS

Huawei, "R1-1911883, Sidelink resource allocation mode 1", 3GPP TSG RAN WG1 #99, 3GPP server publication date (Nov. 9, 2019).
(Continued)

*Primary Examiner* — Benjamin Lamont
(74) *Attorney, Agent, or Firm* — Ashurst Perkins Coie US LLP; Michael A. Glenn

(57) ABSTRACT

A user device, UE, for a wireless communication system is described. The wireless communication system included a plurality of user devices, UEs. The UE is to communicate with one or more further UEs using a sidelink interface, SL, like a PC5 interface. The UE is to send to the further UE one or more reports or assistance information messages, AIMs, to provide the further UE with one or more of the following: resource allocation related assistance information, link related assistance information, distance related assistance information, geographical area related assistance information, group related assistance information, relay related assistance information.

17 Claims, 8 Drawing Sheets

(56) References Cited

U.S. PATENT DOCUMENTS

| | | | | |
|---|---|---|---|---|
| 2021/0204250 | A1* | 7/2021 | Ashraf | H04W 4/40 |
| 2021/0219268 | A1* | 7/2021 | Li | H04L 1/1819 |
| 2021/0306824 | A1* | 9/2021 | Li | H04W 4/40 |
| 2021/0400639 | A1* | 12/2021 | Lee | H04W 24/10 |
| 2023/0087401 | A1* | 3/2023 | Shin | H04W 4/46 370/329 |

FOREIGN PATENT DOCUMENTS

| | | | |
|---|---|---|---|
| WO | 2020033088 | A1 | 2/2020 |
| WO | 2020033089 | A1 | 2/2020 |

OTHER PUBLICATIONS

Huawei, "R1-1911887, Sidelink physical layer procedures for NR V2X", 3GPP TSG RAN WG1 #99, 3GPP server publication date (Nov. 9, 2019).

LG Electronics, "R1-1913479, Feature lead summary #2 for AI 7.2.4.5 Physical layer procedures for sidelink", 3GPP TSG RAN WG1 #99, 3GPP server publication date (Nov. 26, 2019).

Asustek, "Discussion on sidelink structure in NR V2X", 3GPP TSG RAN WG1 #98bis R1-1911208, Oct. 4, 2019.

Fraunhofer HHI , "Resource Allocation for Mode 2 NR V2X", 3GPP TSG-RAN WG2 Meeting #108 R2-1915555, Nov. 8, 2019.

MediaTek Inc. , "On Sidelink Resource Allocation Mechanism", GPP TSG RAN WG1 Meeting #95 R1-1812367, Nov. 3, 2018.

"Discussion of Mode 2 enhancements", 3GPP TSG RAN WG1, #103-eR1-2008975, MediaTek Inc., 2020, pp. 1-4.

"Resource Allocation Enhancements for Mode 2", 3GPP TSG RAN WG1 Meeting #103-e R1-2008757, Fraunhofer HHI, Fraunhofer IIS, Nov. 2, 2020, 9 pages.

Huawei, "Remaining details of sidelink physical layer structure", R1-2000181, 3GPP TSG RAN WG1 #100, published on the 3GPP server on Feb. 15, 2020, 26 pages.

Intel Corporation, "FL summary of critical issues for 7.2.4.2.2—V2X Mode 2", R1-2001138, 3GPP TSG RAN WG1 #100, published on the 3GPP server on Feb. 18, 2020, 26 pages.

* cited by examiner

NR SIDELINK ASSISTANCE INFORMATION MESSAGES

CROSS-REFERENCE TO RELATED APPLICATIONS

This application is a continuation of copending International Application No. PCT/EP2021/056932, filed Mar. 18, 2021, which is incorporated herein by reference in its entirety, and additionally claims priority from European Application No. 20164706.2, filed Mar. 20, 2020, which is also incorporated herein by reference in its entirety.

TECHNICAL FIELD

The present application relates to the field of wireless communication systems or networks, more specifically to a communication among user devices, UEs, using a sidelink, SL. Embodiments of the present invention concern assistance information messages, AIMs, to provide the UEs with one or more of resource allocation related assistance information, link related assistance information, distance related assistance information, geographical area related assistance information, group related assistance information, and relay related assistance information.

BACKGROUND OF THE INVENTION

FIG. 1 is a schematic representation of an example of a terrestrial wireless network 100 including, as is shown in FIG. 1(*a*), a core network 102 and one or more radio access networks $RAN_1$, $RAN_2$, . . . . $RAN_N$. FIG. 1(*b*) is a schematic representation of an example of a radio access network $RAN_n$ that may include one or more base stations $gNB_1$ to $gNB_5$, each serving a specific area surrounding the base station schematically represented by respective cells $\mathbf{106}_1$ to $\mathbf{106}_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 1(*b*) shows an exemplary view of five cells, however, the $RAN_n$ may include more or less such cells, and $RAN_n$ may also include only one base station. FIG. 1(*b*) shows two users $UE_1$ and $UE_2$, also referred to as user equipment, UE, that are in cell 1062 and that are served by base station $gNB_2$. Another user $UE_3$ is shown in cell $\mathbf{106}_4$ which is served by base station $gNB_4$. The arrows $\mathbf{108}_1$, $\mathbf{108}_2$ and $\mathbf{108}_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(*b*) shows two IoT devices $\mathbf{110}_1$ and $\mathbf{110}_2$ in cell $\mathbf{106}_4$, which may be stationary or mobile devices. The IoT device $\mathbf{110}_1$ accesses the wireless communication system via the base station $gNB_4$ to receive and transmit data as schematically represented by arrow $\mathbf{112}_1$. The IoT device $\mathbf{110}_2$ accesses the wireless communication system via the user $UE_3$ as is schematically represented by arrow $\mathbf{112}_2$. The respective base station $gNB_1$ to $gNB_5$ may be connected to the core network 102, e.g., via the S1 interface, via respective backhaul links $\mathbf{114}_1$ to $\mathbf{114}_5$, which are schematically represented in FIG. 1(*b*) by the arrows pointing to "core". The core network 102 may be connected to one or more external networks. The external network may be the Internet, or a private network, such as an Intranet or any other type of campus networks, e.g., a private WiFi or 4G or 5G mobile communication system. Further, some or all of the respective base station $gNB_1$ to $gNB_5$ may be connected, e.g., via the S1 or X2 interface or the XN interface in NR, with each other via respective backhaul links $\mathbf{116}_1$ to $\mathbf{116}_5$, which are schematically represented in FIG. 1(*b*) by the arrows pointing to "gNBs". A sidelink channel allows direct communication between UEs, also referred to as device-to-device, D2D, communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink channel, PDSCH, the physical uplink shared channel, PUSCH, and the physical sidelink shared channel, PSSCH, carrying user specific data, also referred to as downlink, uplink or sidelink payload data, the physical broadcast channel, PBCH, and the physical sidelink broadcast channel, PSBCH, carrying for example a master information block, MIB, and one or more of a system information block, SIB, one or more sidelink information blocks (SLIBs) if supported, the physical downlink control channel, PDCCH, the physical uplink control channel, PUCCH, and the physical sidelink control channels, PSSCH, carrying for example the downlink control information, DCI, the uplink control information, UCI, or the sidelink control information, SCI. The sidelink interface may also support a 2-stage SCI, which refers to a first control region containing some parts of the SCI, and, optionally, a second control region, which contains a second part of control information.

For the uplink, the physical channels may further include the physical random access channel, PRACH or RACH, used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length, e.g., 1 ms. Each subframe may include one or more slots of 12 or 14 OFDM symbols depending on the cyclic prefix, CP, length. A frame may also consist of a smaller number of OFDM symbols, e.g., when utilizing shortened transmission time intervals, sTTI, or a mini-slot/non-slot-based frame structure comprising just a few OFDM symbols.

The wireless communication system may be any single-tone or multicarrier system using frequency-division multiplexing, like the orthogonal frequency-division multiplexing, OFDM, system, the orthogonal frequency-division multiple access, OFDMA, system, or any other IFFT-based signal with or without CP, e.g., DFT-s-OFDM. Other waveforms, like non-orthogonal waveforms for multiple access, e.g., filter-bank multicarrier, FBMC, generalized frequency division multiplexing, GFDM, or universal filtered multi carrier, UFMC, may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro, cell including a macro base station, like base station $gNB_1$ to $gNB_5$, and a network of small cell base stations, not shown in FIG. 1, like femto or pico base stations. In addition to the above described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like an LTE or 5G/NR network, there may be UEs that communicate directly with each other over one or more sidelink, SL, channels, e.g., using the PC5 or PC3 interface or WiFi direct. UEs that communicate directly with each other over the sidelink may include vehicles communicating directly with other vehicles, V2V communication, vehicles communicating with other entities of the wireless communication network, V2X communication, for example roadside units, RSUs, roadside entities, like traffic lights, traffic signs, or pedestrians. RSUs may have functionalities of BS or of UEs, depending on the specific network configuration. Other UEs may not be vehicular related UEs and may comprise any of the above-mentioned devices. Such devices may also communicate directly with each other, D2D communication, using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs

- may not be connected to a base station, for example, they are not in an RRC connected state, so that the UEs do not receive from the base station any sidelink resource allocation configuration or assistance, and/or
- may be connected to the base station, but, for one or more reasons, the base station may not provide sidelink resource allocation configuration or assistance for the UEs, and/or
- may be connected to the base station that may not support NR V2X services, e.g., GSM, UMTS, LTE base stations.

When considering two UEs directly communicating with each other over the sidelink, e.g., using the PC5/PC3 interface, one of the UEs may also be connected with a BS, and may relay information from the BS to the other UE via the sidelink interface and vice-versa. The relaying may be performed in the same frequency band, in-band-relay, or another frequency band, out-of-band relay, may be used. In the first case, communication on the Uu and on the sidelink may be decoupled using different time slots as in time division duplex, TDD, systems.

FIG. 2 is a schematic representation of an in-coverage scenario in which two UEs directly communicating with each other are both connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a mode 1 configuration in NR V2X or as a mode 3 configuration in LTE V2X.

FIG. 3 is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is the out-of-coverage scenario does not necessarily mean that the respective mode 2 UEs in NR or mode 4 UEs in LTE are outside of the coverage 200 of a base station, rather, it means that the respective mode 2 UEs in NR or mode 4 UEs in LTE are not served by a base station, are not connected to the base station of the coverage area, or are connected to the base station but receive no SL resource allocation configuration or assistance from the base station. Thus, there may be situations in which, within the coverage area 200 shown in FIG. 2, in addition to the NR mode 1 or LTE mode 3 UEs 202, 204 also NR mode 2 or LTE mode 4 UEs 206, 208, 210 are present. In addition, FIG. 3, schematically illustrates an out of coverage UE using a relay to communicate with the network. For example, the UE 210 may communicate over the sidelink with $UE_1$ which, in turn, may be connected to the gNB via the Uu interface. Thus, $UE_1$ may relay information between the gNB and the UE 210.

Although FIG. 2 and FIG. 3 illustrate vehicular UEs, it is noted that the described in-coverage and out-of-coverage scenarios also apply for non-vehicular UEs. In other words, any UE, like a hand-held device, communicating directly with another UE using SL channels may be in-coverage and out-of-coverage.

In a wireless communication system or network, like the one described above with reference to FIG. 1, relay devices or relay nodes may be employed to solve performance issues, like a reduced data rate, a weaker signal and higher interference as it may be encountered on the radio coverage edges of a cell of a base station. The relay node may extract data from a received signal, apply noise correction and retransmit a new signal on its own. Rather than only repeating the signal, the relay node also increases the signal quality. In the 3GPP specifications for 4G, a UE-to-Network relay has been specified. FIG. 4 illustrates a scenario where a relay UE operates as a UE-to-Network relay. The relay device or relay node mentioned above may be a user equipment, UE, and, in the following, is referred to a relay UE. FIG. 4 illustrates a UE 200 that is to connect to a destination 202, e.g., to an entity of the access network 202*a*, like a gNB, of to an entity of the core network 202*a*. The end-to-end communication between the UE 200, that is also referred to as the remote UE, and the destination uses a relay UE 206 that provides functionality to support connectivity to the destination in the core network 202 for the remote UE 200. The remote UE 200 and the relay UE may communicate using the PC5 interface, and the relay UE and the access network may communicate using the Uu interface.

In NR or 5G, in addition to the UE-to-Network relay, also a UE-to-UE relay is supported. In such a scenario, the destination 202 is another UE. FIG. 5 illustrates a scenario where the relay is a UE-to-UE relay 206. The remote UE 200 is to connect to the other UE 202, and the relay UE 206 provides functionality to support connectivity to the destination UE 208, for the remote UE 200. The remote UE 200 and the relay UE may communicate using the PC5 interface, and the relay UE and the other UE 202 may communicate using also the PC5 interface.

Although FIG. 4 and FIG. 5 illustrate the relay to be a UE, it is noted that the relay may be any entity having network connectivity and enabling that the remote UE 200 is connected to the destination 202, like the core network or another UE. For example, the relay entity could be a group leader UE, a roadside unit, RSU, or any mobile or stationary device. Such a relay entity may be a relay node having some base station functionality, such as scheduling of resources, etc. Furthermore, a relay can also be a relay node in the classical sense, e.g., a base station infrastructure device, providing relaying functionality as in an amplify and forward (AF) relay, or a decode-and-forward relay (DF), e.g., operating on layer-2 (L2), or even a layer-3 (L3), which forwards data on Internet Protocol (IP)-level.

In the above-described scenarios of vehicular user devices, UEs, a plurality of such user devices may form a user device group, also referred to simply as group, and the communication within the group or among the group members may be performed via the sidelink interfaces between the user devices, like the PC5 interface. For example, the above-described scenarios using vehicular user devices may be employed in the field of the transport industry in which a plurality of vehicles being equipped with vehicular user devices may be grouped together, for example, by a remote driving application. Other use cases in which a plurality of user devices may be grouped together for a sidelink communication among each other include, for example, factory automation and electrical power distribution. In the case of factory automation, a plurality of mobile or stationary machines within a factory may be equipped with user devices and grouped together for a sidelink communication, for example for controlling the operation of the machine, like a motion control of a robot. In the case of electrical power distribution, entities within the power distribution grid may be equipped with respective user devices which, within a certain area of the system may be grouped together so as to communicate via a sidelink communication with each other so as to allow for monitoring the system and for dealing with power distribution grid failures and outages.

Naturally, in the above-mentioned use cases, sidelink communication is not limited to a communication within a group. Rather, the sidelink communication may be among any of UEs, like any pair of UEs.

Starting from the known technology as described above, there may be a need for enhancements or improvements for a sidelink communication by a UE, like an out-of-coverage UE.

SUMMARY

An embodiment may have a user device, UE, for a wireless communication system, the wireless communication system including a plurality of user devices, UEs, wherein the UE is to communicate with one or more further UEs using a sidelink interface, SL, like a PC5 interface, wherein the UE is to send to the further UE one or more reports or assistance information messages, AIMs, to provide the further UE with one or more of the following:

- resource allocation related assistance information,
- link related assistance information,
- distance related assistance information,
- geographical area related assistance information,
- group related assistance information,
- relay related assistance information.

Another embodiment may have a user device, UE, for a wireless communication system, the wireless communication system including a plurality of user devices, UEs, wherein the UE is to communicate with one or more further UEs using a sidelink, SL, and wherein the UE is to receive from another UE one or more reports or assistance information messages, AIMs, providing the UE with one or more of the following:

- resource allocation related assistance information,
- link related assistance information,
- distance related assistance information,
- geographical area related assistance information,
- group related assistance information,
- relay related assistance information.

According to another embodiment, a wireless communication system may have a plurality of inventive user devices, UEs, as mentioned above and configured for a sidelink communication using, for example resources from a set of sidelink resources of the wireless communication system.

According to another embodiment, a method for operating a user device, UE, of a wireless communication system including a plurality of user devices, UEs, may have the steps of: operating the UE to communicate with one or more further UEs using a sidelink interface, SL, like a PC5 interface, and sending, by the UE, to the further UE one or more reports or Replacement Specification-CLEAN version assistance information messages, AIMs, to provide the further UE with one or more of the following:

- resource allocation related assistance information,
- link related assistance information,
- distance related assistance information,
- geographical area related assistance information,
- group related assistance information,
- relay related assistance information.

According to still another embodiment, a method for operating a user device, UE, of a wireless communication system including a plurality of user devices, UEs, may have the steps of: operating the UE to communicate with one or more further UEs using a sidelink, SL, and receiving, at the UE, from another UE one or more reports or assistance information messages, AIMs, providing the UE with one or more of the following:

resource allocation related assistance information,
link related assistance information,
distance related assistance information,
geographical area related assistance information,
group related assistance information,
relay related assistance information.

Another embodiment may have a non-transitory digital storage medium having stored thereon a computer program for performing a method for operating a user device, UE, of a wireless communication system including a plurality of user devices, UEs, having the steps of: operating the UE to communicate with one or more further UEs using a sidelink interface, SL, like a PC5 interface, and sending, by the UE, to the further UE one or more reports or assistance information messages, AIMs, to provide the further UE with one or more of the following:

resource allocation related assistance information,
link related assistance information,
distance related assistance information,
geographical area related assistance information,
group related assistance information,
relay related assistance information, when said computer program is run by a computer.

BRIEF DESCRIPTION OF THE DRAWINGS

Embodiments of the present invention are now described in further detail with reference to the accompanying drawings, in which.

DETAILED DESCRIPTION OF THE INVENTION

Figure 1A:
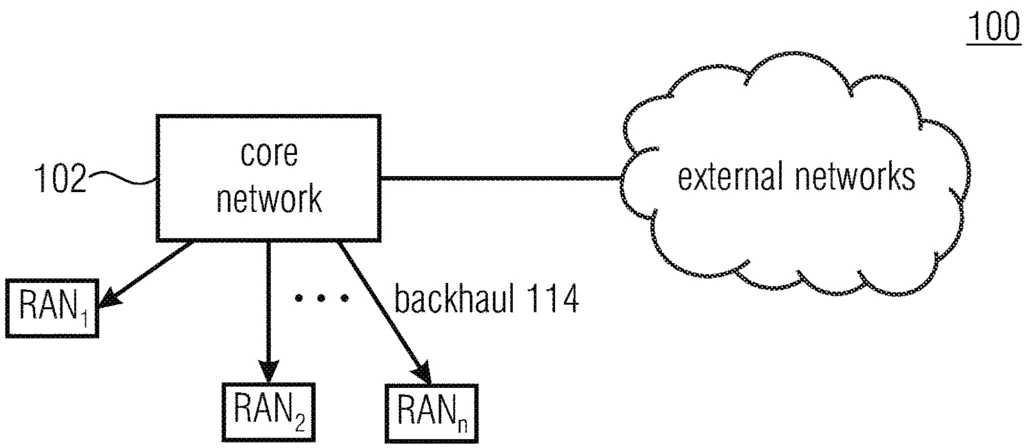
FIG. 1*a-b* shows a schematic representation of an example of a wireless communication system.

Embodiments of the present invention are now described in more detail with reference to the accompanying drawings in which the same or similar elements have the same reference signs assigned.

In the wireless communication system or network, like the one described above with reference to FIG. 1, FIG. 2 or FIG. 3, an out-of-coverage UE, for performing a sidelink communication, like a transmission of data, may need certain information for performing a transmission on the SL in such a way that certain requirements of the transmission are fulfilled. For example, the UE needs to perform sensing operations so as to obtain, for example, from a set of available set of sidelink resources or from a sidelink resource pool as provided by the wireless communication system, reliable resources to be used for the transmission of the UE's data. In other words, conventionally, an out-of-coverage UE, like a UE operating in Mode 2, carries out sensing to identify candidate resources from the sidelink resource pool that it may use for the transmission of data. The UE needs to carry out the sensing for a certain period of time so as to identify the available resources for the transmission in a reliable manner. However, the conventional approach of carrying out sensing to identify candidate resources entails a substantial amount of operations to be carried out by the UE, which, for example, in case of power sensitive and/or bandwidth-restricted UEs, like battery driven devices, may be disadvantageous in terms of power saving and low-complexity. Moreover, since the sensing operations need to be carried out for a substantial period of time so as to obtain adequate resources for a transmission, the sensing leads to an increase in the latency for the transmission of data packets. While the increased latency issue might be addressed by decreasing the time period for performing the sensing operations, this, in turn, leads to a situation that, due to the shortened time period for the sensing, non-optimal or inadequate resources may be determined by the UE leading, in turn, to a transmission with a reduced reliability. The problem with the increased latency/reduced reliability may be aggravated in situations in which the out-of-coverage UE operates in a discontinuous reception, DRX, mode.

The above-mentioned drawbacks in conventional approaches may not only be associated with the resource allocation for the SL transmission. For the operation over the SL, the UE may need to obtain, in addition to the resource allocation information or instead of the resource allocation information, one or more of link related assistance information, distance related assistance information, geographical area related assistance information, group related assistance information, relay related assistance information. Obtaining any of this information by the UE may solve the above-mentioned problems.

For example, with regard to the link quality information, the UE may need to obtain one or more of:

a report including quality information about a link between two or more of the SL UEs, or beamforming information, e.g., a Sounding Reference Signal, SRS, or a SRS Resource Indicator, SRI.

For example, with regard to the distance related assistance information, the UE may need to obtain one or more of:

a minimum required communication range for a communication between two or more SL UEs, e.g., to determine whether a SL UE is to send a Hybrid Automatic Repeat Request, HARQ, feedback or not, or a physical distance between two or more SL UEs, e.g., to determine the transmission power to be used, a zone ID or a list of zone IDs, relating to the geographical position of one further UE and/or other further UEs, e.g., to be used to optimize transmission power or feedback procedures, e.g., HARQ, or to select links for communication.

For example, with regard to the geographical area related assistance information, the UE may need to obtain one or more of:

geographical information, e.g., GPS coordinates, or path tracking information, e.g., to inform the further UEs about the direction and speed of the UE, or route information, e.g., to inform the further UEs about the potential exit of the UE from a platoon, a zone ID or a list of zone IDs, relating to the geographical position of one further UE and/or other further UEs, e.g., to be used to optimize transmission power or feedback procedures, e.g., HARQ, or to select links for communication.

For example, with regard to the group related assistance information, the UE may need to obtain one or more of:

an identification of the group, e.g., a group ID, or an identification of a group leader, e.g., a group leader ID, or an identification of one or more group members, e.g., a group member ID, or configuration information, e.g., resource pool information indicating resources to be used for a communication within the group, or transmission related information, e.g., transmission parameters to be used for group communication, e.g., modulation and coding scheme, MCS, transmit power, timing advance, TA, HARQ operation, a list of group members, or trajectory information of the group members, e.g., to determine a possibility of a UE leaving the group, or a distance between member UEs or other distance-related information, like a vector with zone IDs, e.g., to determine whether to send HARQ feedback or not, or resources to be used for transmission within the resource pool, or information regarding an addition or a removal of one or more member UEs to or from the group.

For example, with regard to the relay related assistance information, the UE may need to obtain one or more of:

one or more relay UEs, or a capacity of one or more relay UEs, or a transmission mode of one or more relay UEs, or an identification of one or more relay UEs, like a relay UE ID, or a selected relay UE, or one or more candidate relay UEs, or a capacity of a set of one or more candidate relay UEs, or a transmission mode of one or more candidate relay UEs, or a distance and/or path information of one or more candidate relay UEs.

Embodiments of the present invention address the above drawbacks in conventional approaches by employing an inter-UE coordination for addressing the challenges for out-of-coverage UEs, like UEs operating in Mode 2. The inventive approach, by means of the inter UE coordination, addresses the above-mentioned problems and in accordance with embodiments, rather than obtaining the above-mentioned information by the UE, this information is provided to the UE using one or more reports or assistance information messages, AIMs, including one or more of the following:

resource allocation related assistance information, link related assistance information, distance related assistance information, geographical area related assistance information, group related assistance information, relay related assistance information.

Figure 1B:
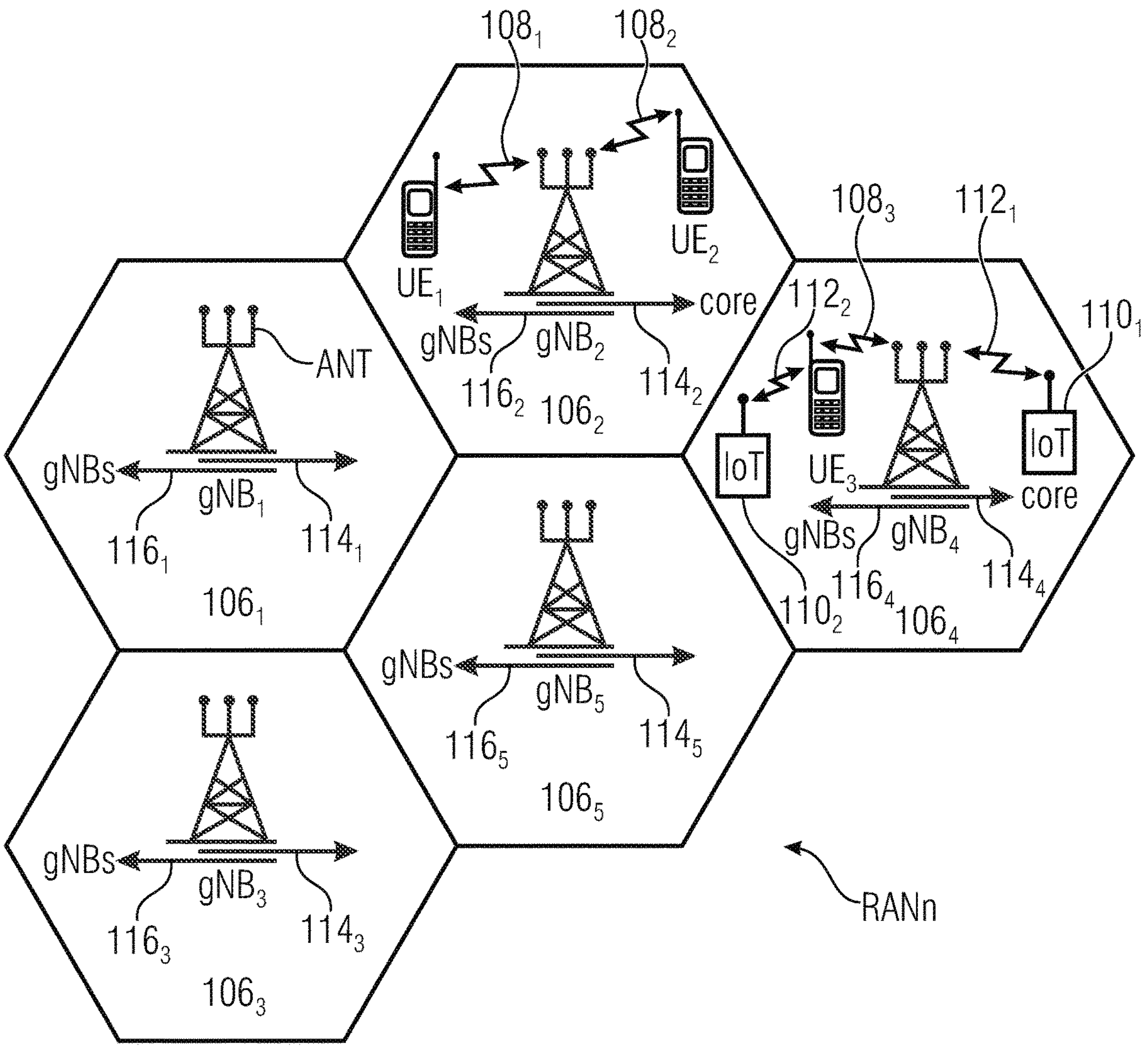
Figure 2:
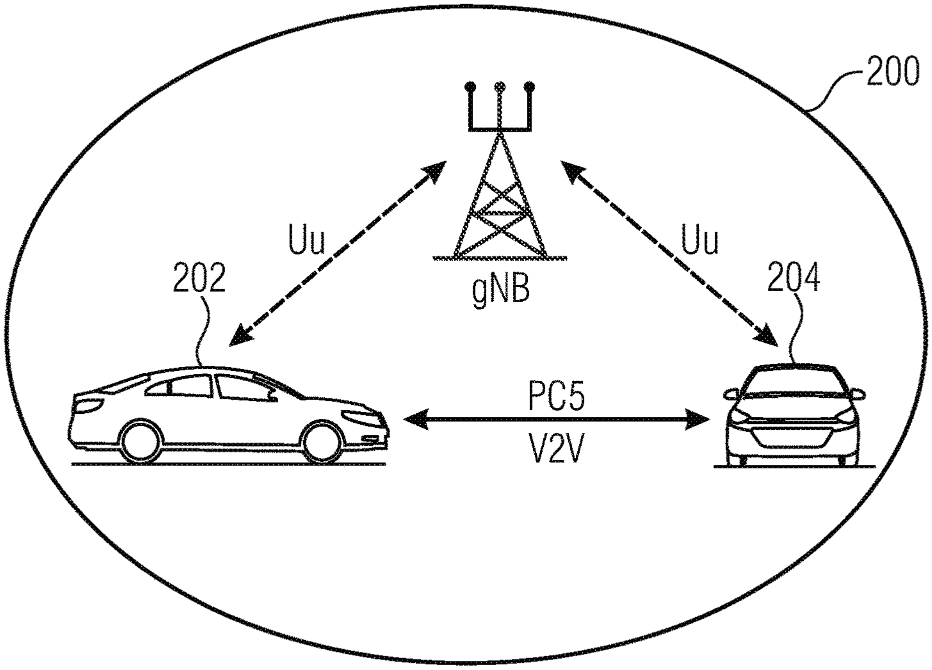
FIG. 2 is a schematic representation of an in-coverage scenario in which two UEs directly communicating with each other are both connected to a base station.
Figure 3:
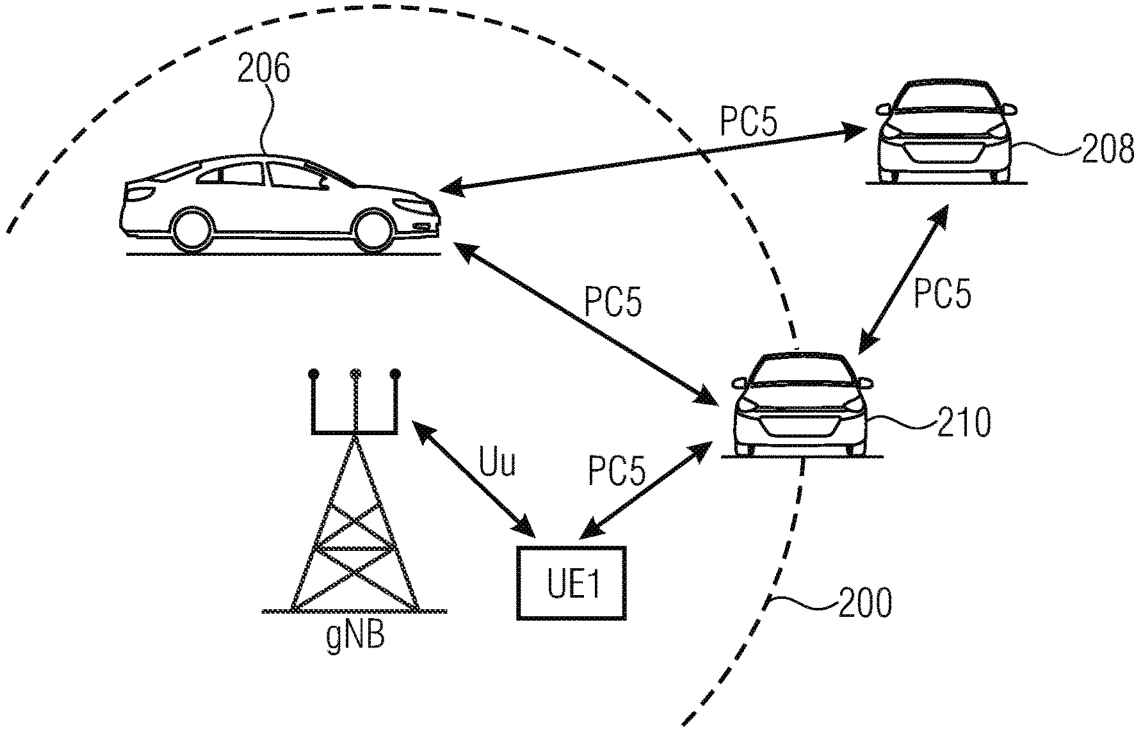
FIG. 3 is a schematic representation of an out-of-coverage scenario in which the UEs directly communicating with each other.
Figure 4:
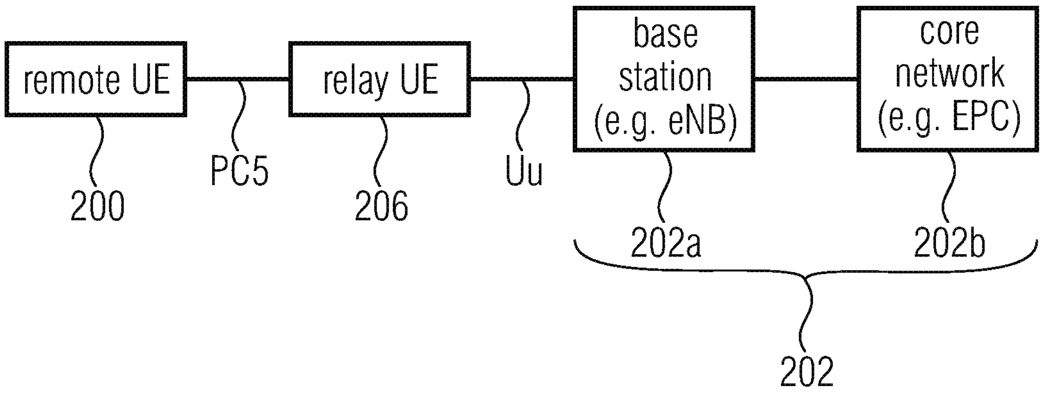
FIG. 4 illustrates a scenario where a relay UE operates as a UE-to-Network relay.
Figure 5:
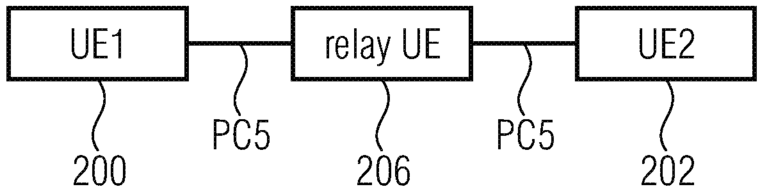
FIG. 5 illustrates a scenario where the relay is a UE-to-UE relay.
Figure 6:
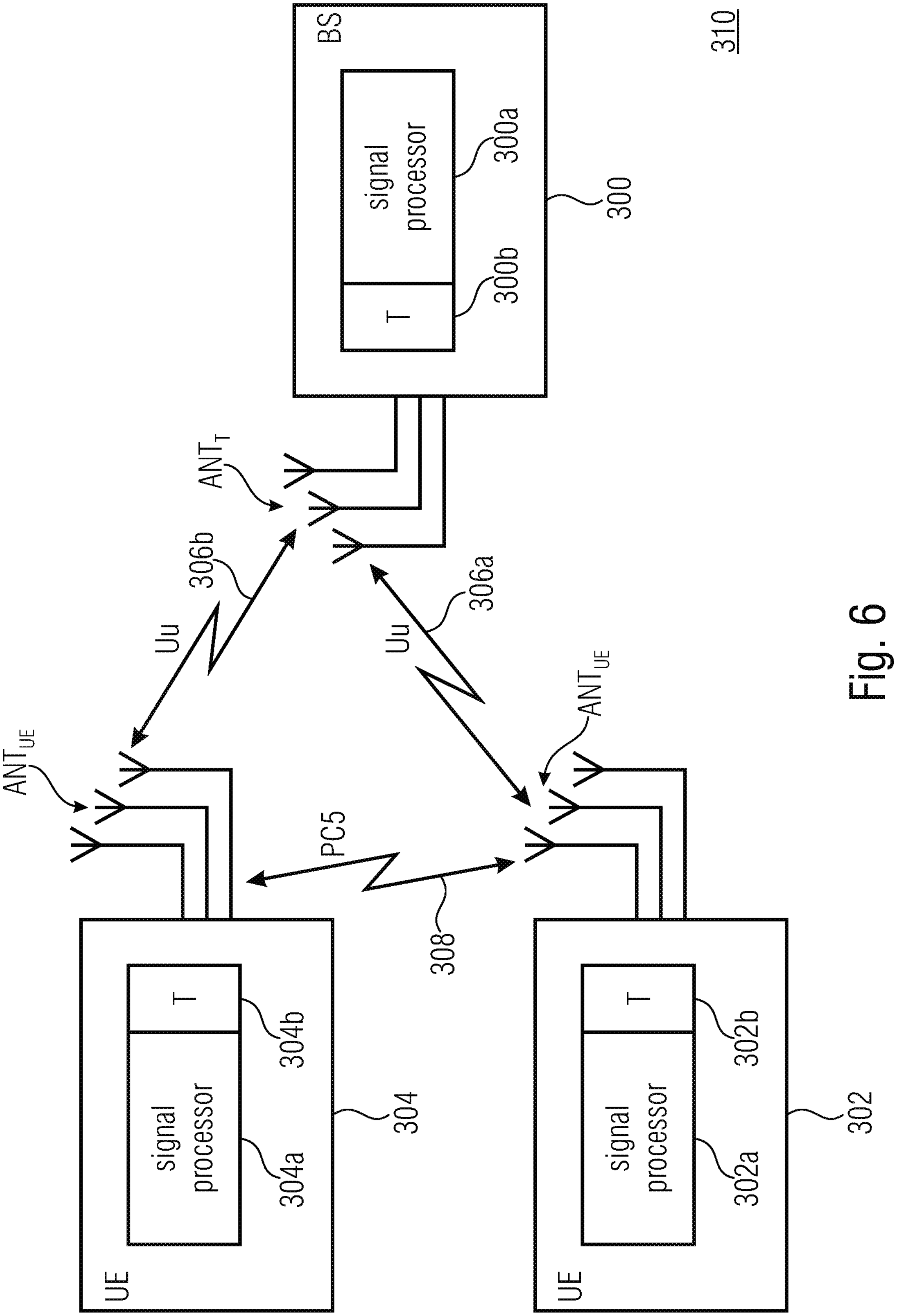
FIG. 6 is a schematic representation of a wireless communication system including a transmitter, like a base station, and one or more receivers, like user devices, UEs capable of operating in accordance with embodiments of the present invention.

Thereby, the present invention overcomes the above problems. For example, the inventive approach allows the SL UE to meet predefined reliability and latency requirements, as they are found, for example, in NR. Inter-UE coordination is basically to be seen as assistance provided by a first UE to a second UE. Embodiments of the present invention may be implemented in a wireless communication system as depicted in FIG. 1, FIG. 2 or FIG. 3 including base stations and users, like mobile terminals or IoT devices. FIG. 6 is a schematic representation of a wireless communication system including a transmitter 300, like a base station, and one or more receivers 302, 304, like user devices, UEs. The transmitter 300 and the receivers 302, 304 may communicate via one or more wireless communication links or channels 306*a*, 306*b*, 308, like a radio link. The transmitter 300 may include one or more antennas $ANT_T$ or an antenna array having a plurality of antenna elements, a signal processor 300*a* and a transceiver 300*b*, coupled with each other. The receivers 302, 304 include one or more antennas $ANT_{UE}$ or an antenna array having a plurality of antennas, a signal processor 302*a*, 304*a*, and a transceiver 302*b*, 304*b* coupled with each other. The base station 300 and the UEs 302, 304 may communicate via respective first wireless communication links 306*a* and 306*b*, like a radio link using the Uu interface, while the UEs 302, 304 may communicate with each other via a second wireless communication link 308, like a radio link using the PC5/sidelink (SL) interface. When the UEs are not served by the base station, are not be connected to a base station, for example, they are not in an RRC connected state, or, more generally, when no SL resource allocation configuration or assistance is provided by a base station, the UEs may communicate with each other over the sidelink (SL). The system or network of FIG. 6, the one or more UEs 302, 304 of FIG. 6, and the base station 300 of FIG. 6 may operate in accordance with the inventive teachings described herein.

User Device Providing an Assistance Information Message

The present invention provides a user device, UE, for a wireless communication system, the wireless communication system including a plurality of user devices, UEs, wherein the UE (UE-A) is to communicate with one or more further UEs (UE-B) using a sidelink interface, SL, like a PC5 interface, wherein the UE (UE-A) is to send to the further UE (UE-B) one or more reports or assistance information messages, AIMs, to provide the further UE (UE-B) with one or more of the following:

resource allocation related assistance information, link related assistance information, distance related assistance information, geographical area related assistance information, group related assistance information, relay related assistance information.

--------AIM Contents=Resource Allocation Related Assistance Information--------

In accordance with embodiments, the resource allocation related assistance information indicates resources to be used by the further UE, wherein the indicated resources are in the form of, e.g., one or more of the following:

one or more receive resource pools to be used by the further UE, one or more transmit resource pools to be used by the further UE, one or more exceptional resource pools to be used by the further UE, one or more resources within a resource pool to be used for transmission by the further UE to another further UE, for periodic transmissions e.g., semi-persistent transmissions, or for aperiodic transmissions, e.g., one-shot transmissions, one or more bandwidth parts, BWPs, to be used by the further UE, interference information, e.g., RSRQ or SINR reports, a resource pool congestion status, e.g., a CBR measurement report, a sensing report, e.g., a zonal area resource usage map, ZARUM.

In accordance with embodiments, the UE (UE-A) is to determine from a set of sidelink resources or from a sidelink resource pool of the wireless communication system a set of resources that are available and/or unavailable for usage by one or more of the further UEs (UE-B), and the UE (UE-A) is to send to the further UE (UE-B) one or more AIMs including the determined set of resources, so as to allow the further UE (UE-B) to decide the transmission resources to be used.

In accordance with embodiments, the UE (UE-A) is to determine the set of resources by sensing, e.g., in case the UE is out-of-coverage or operating in Mode 2, or from resources provided to the UE by a base station of the wireless communication system directly, e.g., in case the UE is in Mode 1 or in-coverage, or indirectly via a relay, e.g., in case the UE is in Mode 2 or in- or out-of-coverage.

In accordance with embodiments, the further UE (UE-B) is one or more of out-of-coverage, operating in mode 1, operating in mode 2, connected to a relay.

In accordance with embodiments, the AIM includes resources to be used by the further UE (UE-B) for a transmission to one or more other further UEs (UE-C), the other further UE (UE-C) being different from the UE (UE-A).

In accordance with embodiments, the UE is configured and/or pre-configured with one or more resource pools, e.g., transmit, receive or exceptional resource pools, to be used for sidelink communications, and wherein the UE is to send the AIM in one or more of the following ways:

send only an AIM including resources of one of the resource pools, send an AIM including resources of two or more or all of the plurality of resource pools, wherein each AIM contains resources pertaining to a single or a plurality of resource pools.

In accordance with embodiments, the plurality of resource pools includes any combination of one or more of the following resource pools:

a first resource pool providing resources for a feedback channel over the sidelink, like the PSFCH, and a second resource pool providing no resources for a feedback channel over the sidelink, resources pools of different QoS levels, resources pools of different priority levels, resources pools of different communication types, like unicast, multicast or groupcast, or broadcast, one or more transmit pools, one or more receive pools, one or more of exceptional pools.

In accordance with embodiments, the UE is to categorize the available resources based on a plurality of priority levels that the available resources are capable to transmit, and the UE is to send one or more AIMs to the further UE, each AIM pertaining to one or more priority levels.

In accordance with embodiments, to categorize the available resources, the UE is to compare a power level measured in a given SL resource, like the SL reference signal received power, SL-RSRP, against one or more predefined power thresholds, like RSRP thresholds, based on the priority of an intended transmission and on the priority of the received transmission on a given resource.

In accordance with embodiments, the AIM indicates a resource set to be used by the further UE in any one of the following manners:

by a list of all resource blocks, RBs, that are available in one or more time slots, by a list of all resource blocks, RBs, that are unavailable in one or more time slots, by a list of resource blocks, RBs, for which collisions are expected, e.g., a list of reserved resources where the further UE is expected to transmit as well.

In accordance with embodiments, the AIM indicates the resource across time in any one of the following manners:

by a bitmap across time, the bitmap indicating resources, like OFDM symbols or time slots or subframes or frames, where the resource set is defined, spanning either a portion or the entire length of the one BWP, by a starting resource, like a time slot or a subframe, and a duration of the resource set, by explicit resources numbers, like time slot or subframe numbers, by puncturing out resources mentioned explicitly or that are part of another set of resources or RP, by a starting resource, and periodic offsets for subsequent occurrences, by a pattern of symbols, time slots or subframes or frames, and/or the AIM indicates the resource across frequency in any one of the following manners:

by a bitmap, the bitmap the bitmap indicating resources, like resource blocks, across the one BWP,

- by a starting resource, like a resource block, and a number of resources for a resource set,
- by multiple starting resources, like resource blocks, and ending resources, if the resource set is non-contiguous over frequency,
- by explicit resource indices, like resource block indices,
- by puncturing out resources mentioned explicitly or that are part of another set of resources or RP,
- by a starting resource, and periodic offsets for subsequent occurrences,
- by a pattern of resource blocks or subchannels, and/or the AIM indicates the resources across time and frequency in any one of the following manners:

- by a matrix, the matrix indicating the resources across time, like symbols, time slots or subframes or frames, and across frequency, like resource blocks or subchannels,
- by a pattern, the pattern indicating the resources across time, like symbols, time slots or subframes or frames, and across frequency, like resource blocks or subchannels.

--------AIM contents=link related assistance information--------

In accordance with embodiments, the link related assistance information includes one or more of the following:

- link quality information, e.g., a report including quality information about a link between one further UE (UE-B) and another further UE (UE-C),
- beamforming information, e.g., a Sounding Reference Signal, SRS, or a SRS Resource Indicator, SRI,
- one or more transmission power thresholds, e.g., information to restrict the transmit power of a UE in order to reduce the interference on links between further UEs.

--------AIM Contents=Distance Related Assistance Information--------

In accordance with embodiments, the distance related assistance information includes one or more of the following:

- a minimum required communication range for a communication between one further UE (UE-B) and another further UE (UE-C), e.g., to determine whether the further UE is to send a HARQ feedback or not,
- a physical distance between one further UE and another further UE e.g., to determine the transmission power to be used,
- a zone ID or a list of zone IDs, relating to the geographical position of one further UE and/or other further UEs, e.g., to be used to optimize transmission power or feedback procedures, e.g., HARQ, or to select links for communication.

--------AIM Contents=Geographical Area Related Assistance Information--------

In accordance with embodiments, the geographical area related assistance information includes one or more of the following:

- geographical information, e.g., GPS coordinates,
- path tracking information, e.g., to inform the further UEs about the direction and speed of the UE,
- route information, e.g., to inform the further UEs about the potential exit of the UE from a platoon,
- a zone ID or a list of zone IDs, relating to the geographical position of one further UE and/or other further UEs, e.g., to be used to optimize transmission power or feedback procedures, e.g., HARQ, or to select links for communication.

--------AIM Contents=Group Related Assistance Information--------

In accordance with embodiments, the group related assistance information includes one or more of:

- an identification of the group, e.g., a group ID,
- an identification of a group leader, e.g., a group leader ID,
- an identification of one or more group members, e.g., a group member ID, configuration information, e.g., resource pool information indicating resources to be used for a communication within the group,
- transmission related information, e.g., transmission parameters to be used for group communication, e.g., modulation and coding scheme, MCS, transmit power, timing advance, TA, HARQ operation,
- a list of group members,
- trajectory information of the group members, e.g., to determine a possibility of a UE leaving the group,
- a distance between member UEs or other distance-related information, like a vector with zone IDs, e.g., to determine whether to send HARQ feedback or not,
- resources to be used for transmission within the resource pool, information regarding an addition or a removal of one or more member UEs to or from the group.

In accordance with embodiments, the UE is a part of one or more groups of UEs, the group including one or more of the further UEs.

--------AIM Contents=Relay Related Assistance Information--------

In accordance with embodiments, the relay related assistance information includes one or more of:

- one or more relay UEs,
- a capacity of one or more relay UEs,
- a transmission mode of one or more relay UEs,
- an identification of one or more relay UEs, like a relay UE ID,
- a selected relay UE,
- one or more candidate relay UEs,
- a capacity of a set of one or more candidate relay UEs,
- a transmission mode of one or more candidate relay UEs,
- a distance and/or path information of one or more candidate relay UEs.

--------Aspects Independent of AIM Contents--------

In accordance with embodiments, the UE is to send or transmit the one or more AIMs in one or more of the following methods:

- using a configuration message, like a PC5 RRC configuration or MAC CE message, in a unicast, multicast, groupcast or broadcast manner, or
- as a part of a control message, like a SCI, e.g., contained within a 2nd-stage SCI, the SCI including fields informing the further UE (UE-B) about the content of the AIM, or
- as a part of a data transmission, which is indicated by parameters in the accompanying control message, like a SCI, or
- as an information block, e.g., in the PSSCH as a sidelink information block, SLIB.

In accordance with embodiments, when transmitting the one or more AIMs as a part of a control message, the UE is to transmit a first stage SCI indicating a second stage SCI format containing the AIM to be used by the further UE (UE-B).

In accordance with embodiments, when transmitting the one or more AIMs as a part of the data transmission, the indication in the control message may be one of the following:

a beta_offset_indicator in a first stage SCI, a parameter to be set by the UE in a first stage SCI or second stage SCI for indicating the presence of the AIM in the PSSCH.

In accordance with embodiments, the UE is to set a beta_offset_indicator in a first stage SCI to a certain value to indicate the presence of the AIM in the data section of the transmission, or when the AIMs have a fixed size and the presence of an AIM, e.g., as part of a second stage SCI or as additional control information in the data section, is indicated by the first stage and/or second stage SCI and/or higher layer signaling, the UE is to set a beta_offset_indicator in a first stage SCI to a certain value indicating the size only of the control information other than the AIM in the PSSCH, e.g., link reports, or a second 2nd stage SCI, or when the AIMs have different sizes and the presence of an AIM, e.g., as part of a second stage SCI or as additional control information in the data section, is indicated by the first stage and/or second stage SCI and/or higher layer signaling, the UE is to set a beta_offset_indicator in a first stage SCI to a certain value indicating the presence and/or size of the AIM in a second stage SCI and/or in the PSSCH.

In accordance with embodiments, when transmitting the one or more AIMs as an information block which is part of a data transmission, the UE is to transmit the one or more SLIBs as a normal data transmission with feedback enabled, wherein the further UE (UE-B) provides feedback to the UE (UE-A) depending on whether or not the SLIB was successfully received.

In accordance with embodiments, when transmitting the one of more AIMs as an information block, the resources used for the transmission of the information block, like the SLIB, are indicated in a system information block, SIB, or a master information block, MIB, wherein the further UEs (UE-B) are aware of the support of SLIBs as well as the time and frequency resources used for transmission of the SLIB from the SIB or MIB.

In accordance with embodiments, the UE is to transmit the one or more AIMs in one or more of the following methods:

at periodic intervals, or responsive to a request by the further UE (UE-B), or responsive to one or more implicit events.

In accordance with embodiments, transmitting the one or more AIMs at periodic intervals, the UE is to transmit the one or more AIMs using a configuration message, like a PC5 RRC configuration or MAC CE message, in a unicast, multicast or broadcast manner, or as an information block, wherein the resources used for the transmission of the information block, like a SLIB, are indicated in a system information block, SIB, or a master information block, MIB, wherein the further UEs (UE-B) are aware of the support of SLIBs, the periodic intervals as to when the SLIB is transmitted, as well as the time and frequency resources used for transmission of the SLIB from the SIB or MIB.

In accordance with embodiments, when transmitting the one or more AIMs responsive to a request by the further UE (UE-B), the UE is to receive from the further UE (UE-B) an explicit request to send the AIM to assist in the resource allocation at the further UE, e.g., using PC5 RRC signaling by sending a request for resources, e.g., a scheduling request or BSR, and in response to the request, transmit the AIM to one or more further UEs (UE-B).

In accordance with embodiments, the UE is to receive a request from the further UE (UE-B) in one or more of the following scenarios:

a transmission of one or more packets requires a high reliability and/or a low latency and/or high priority, inadequate or no sensing results are available at the UE, e.g., in case of a handover or a radio link failure, RLF or in case that the UE is performing DRX and does not carry out sensing, the power level of the UE is below a pre-defined threshold, e.g., in the case the UE is operating in a restricted, geo-fenced area, or in the case the UE is operating in a highly dense area, the UE wants improve its power consumption by reducing sensing efforts and limit sensing to a pre-defined set of resources/resource pools, when the geo-fencing related information is going to expire or has expired and requires an updated geo-fencing AIM, when the UE enters or exits an existing group of further UEs, when the link quality between the UE and a further UE deteriorates below a pre-defined threshold, and the UE requests for a relay UE for assistance.

In accordance with embodiments, when transmitting the one or more AIMs responsive to one or more implicit events, the UE is to automatically send an AIM to the further UE (UE-B), when a certain event occurs.

In accordance with embodiments, the certain event includes one or more of the following:

when the UE (UE-A) detects that there is a possibility of consecutive packet collisions for a transmission which is to be carried out by the further UE (UE-B), or an occupancy of the sidelink resource pool reaches a threshold, like a CBR threshold, or a link quality between the further UE and another further UE is below a pre-defined threshold, or a beamforming link has broken down between further UEs, or when the further UE is beyond a pre-defined communication range, or when another further UE enters or exits an existing group of further UEs, or a selection or reselection of a relay UE, e.g., when a link quality has gone below a pre-defined threshold, or when a UE is switched on or before being switched off or leaving a cell, or when a UE is detecting a change in resource pool configuration, or when a UE is entering a certain geographical area, or when a UE is within a certain distance of another UE or detects that another UE (UE-B) is within a certain distance of a further UE (UE-C).

In accordance with embodiments, to detect a possibility of consecutive packet collisions, the UE is to listen to control messages, like SCIs, being transmitted by other UEs on the sidelink, the control message including not only current resources of a transmission, but also resources of one or more future transmissions, and determine, using a control message, like a SCI, from the further UE (UE-B), resources of intended transmissions that are scheduled to occur in the same set of resources, and using the resources of the current, future and intended transmissions, to determine the AIM in order to avoid the further UE from transmitting in these resources.

In accordance with embodiments, when a CBR measured for the SL resource pool hits a pre-defined threshold of occupancy, the UE (UE-A) is to send an AIM including the remaining available resources in the given resource pool.

In accordance with embodiments, the UE and one or more of the further UEs form a UE group, and the UE is to assist one or more of the other group members by providing the one or more AIMs such that one or more of the other group members (UE-Bs) need not carry out sensing.

In accordance with embodiments, the one or more AIMs are associated with a geographical area for which the AIM is valid, thereby allowing a further UE disabling the resources indicated in the AIM or requesting a new AIM when leaving the geographical area, and/or the one or more AIMs are associated with an activation time, e.g., to allow transmitting the AIM multiple times before the activation time to make sure a plurality of UEs successfully receive the AIM before activation.

User Device Receiving an Assistance Information Message

The present invention provides a user device, UE, for a wireless communication system, the wireless communication system including a plurality of user devices, UEs, wherein the UE (UE-B) is to communicate with one or more further UEs (UE-C) using a sidelink, SL, and wherein the UE is to receive from another UE (UE-A) one or more reports or assistance information messages, AIMs, providing the UE (UE-B) with one or more of the following:

resource allocation related assistance information,
link related assistance information,
distance related assistance information,
geographical area related assistance information,
group related assistance information,
relay related assistance information.

In accordance with embodiments, the AIM includes resources to be used by the UE (UE-B) for a transmission to one or more of the further UEs (UE-C), the further UE (UE-C) being different from the other UE (UE-A).

In accordance with embodiments, the UE is to request the one or more AIMs from the other UE (UE-A).

In accordance with embodiments, the UE (UE-B) is to request the one or more AIMs only when the UE requires assistance.

In accordance with embodiments, the UE requires assistance in the resource allocation procedure in one or more of the following cases:

a transmission of one or more packets requires a high reliability and/or a low latency and/or high priority, inadequate or no sensing results are available at the UE, e.g., in case of a handover or a radio link failure, RLF or in case that the UE is performing DRX and does not carry out sensing, the power level of the UE is below a pre-defined threshold, e.g., in the case the UE is operating in a restricted, geo-fenced area, or in the case the UE is operating in a highly dense area, the UE wants improve its power consumption by reducing sensing efforts and limit sensing to a pre-defined set of resources/resource pools, when the geo-fencing related information is going to expire or has expired and requires an updated geo-fencing AIM, when the UE enters or exits an existing group of further UEs, when the link quality between the UE and a further UE deteriorates below a pre-defined threshold, and the UE requests for a relay UE for assistance.

In accordance with embodiments, responsive to receiving the one or more AIMs, the UE is not to carry out sensing for available resources in the SL resource pool.

In accordance with embodiments, the UE (UE-B) is to carry out sensing for available resources in the SL resource pool, and the UE is to select resources for a transmission using the sensing results and the AIM, e.g., resources which the sensing results as well as the AIM indicate to be free.

In accordance with embodiments, the UE and the other UE and, optionally one or more of the further UEs, form a UE group, and the other UE is a group leader UE.

In accordance with embodiments, in case an AIM expires, the UE is to trigger an AIM request message, e.g., via the SL, using a unicast communication, a groupcast communication or a broadcast responsive to which the other UE responds with the AIM.

General

In accordance with embodiments, when being out-of-coverage, the UE is not connected to a base station of the wireless communication system, e.g., the UE operates in Mode 2 or is not in an RRC connected state, so that the UE does not receive from the base station a sidelink resource allocation configuration or assistance, and/or is connected a base station of the wireless communication system, which, for one or more reasons, is not capable to provide a sidelink resource allocation configuration or assistance for the UE, and/or is connected a base station of the wireless communication system not supporting a sidelink service, like a NR V2X service, e.g., a GSM, UMTS or LTE base station.

In accordance with embodiments, the UE comprise one or more of a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and requiring input from a gateway node at periodic intervals, or a mobile terminal, or a stationary terminal, or a cellular IoT-UE, or a vehicular UE, or a vehicular group leader (GL) UE, or an IoT or narrowband IoT, NB-IoT, device, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

System

The present invention provides a wireless communication system, comprising a plurality of the inventive user devices, UEs, and configured for a sidelink communication using, for example resources from a set of sidelink resources of the wireless communication system.

In accordance with embodiments, the wireless communication system comprises one or more base stations, wherein the base station comprises one or more of a macro cell base station, or a small cell base station, or a central unit of a base station, or a distributed unit of a base station, or a road side unit (RSU), or a UE, or a group leader (GL), or a relay or a remote radio head, or an AMF, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

Methods

The present invention provides a method for operating a user device, UE, of a wireless communication system including a plurality of user devices, UEs, the method comprising:

operating the UE (UE-A) to communicate with one or more further UEs (UE-B) using a sidelink interface, SL, like a PC5 interface, and sending, by the UE (UE-A), to the further UE (UE-B) one or more reports or assistance information messages, AIMs, to provide the further UE (UE-B) with one or more of the following:

resource allocation related assistance information,
link related assistance information,
distance related assistance information,
geographical area related assistance information,
group related assistance information,
relay related assistance information.

The present invention provides a method for operating a user device, UE, of a wireless communication system including a plurality of user devices, UEs, the method comprising:

operating the UE (UE-B) to communicate with one or more further UEs (UE-C) using a sidelink, SL, and receiving, at the UE, from another UE (UE-A) one or more reports or assistance information messages, AIMs, providing the UE (UE-B) with one or more of the following:

resource allocation related assistance information,
link related assistance information,
distance related assistance information,
geographical area related assistance information,
group related assistance information,
relay related assistance information.

Computer Program Product

Embodiments of the present invention provide a computer program product comprising instructions which, when the program is executed by a computer, causes the computer to carry out one or more methods in accordance with the present invention.

Figure 7:
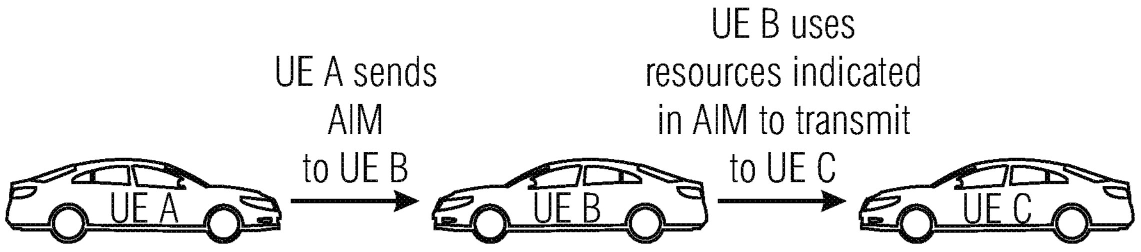
FIG. 7 illustrates a scenario for using inter-UE coordination for supporting an out-of-coverage UE in accordance with embodiments of the present invention.

Embodiments of the inventive approach using inter-UE coordination for supporting an out-of-coverage UE are now described in more detail. FIG. 7 illustrates a scenario for using inter-UE coordination for supporting a UE in need of assistance in accordance with embodiments of the present invention. FIG. 7 illustrates a scenario including three vehicular UEs, namely UE-A, UE-B and UE-C. Although FIG. 7 illustrates vehicular UEs, it is noted that the present invention is not limited vehicular UEs, but may be employed for any kind of UEs communicating over the sidelink. UE-A may support UE-B for a transmission over the sidelink, SL, to UE-C. UE-A may transmit or send one or more assistance information messages, AIMs, to UE-B which, in turn, uses the information indicated in the AIM for a transmission to UE-C. UE-B may be an out-of-coverage UE. The information includes one or more of the above-mentioned resource allocation information, link related assistance information, distance related assistance information, geographical area related assistance information, group related assistance information, and relay related assistance information. Instead of obtaining the information itself, e.g., by performing sensing operations in case of the resource allocation, information, UE-B relies on the information in the AIM received from UE-A for, e.g., performing a transmission of data and/or control data over the sidelink to UE-C. Thus, in accordance with embodiments, the information included in the AIM, which are received at UE-B from UE-A are not only for a communication between UE-A and UE-B but may be used by the UE-B for any communication to another UE over the sidelink, like UE-C that is different from UE-A. UE-A may indicate UE-C explicitly in the AIM. However, UE-C may also be unknown for UE-A.

In accordance with embodiments, UE-B may be out-of-coverage, or operating in mode 1, or operating in mode 2, or connected to a relay. UE-A may be in coverage, and UE-B may be in Mode 2, in coverage or out-of-coverage, and UE-B intends to transmit on the recommended resources to UE-C that may or may not be in coverage.

For example, when UE-A is in coverage, it may obtain the resource pool from the gNB, and provide resources within this pool to other UEs. UE-A may also be provided with a specific set of resources to be forwarded to UE-B. When UE-A is out of coverage, the UE-A carries out sensing and then forwards some or all of the sensing results, like resources, to UE-B. UE-B operates in Mode 2 and receives no assistance directly from the gNB. Therefore, UE-B relies on the AIMs received from UE-A, either solely or coupled with its own sensing, to decide on resources to transmit to UE-C.

Embodiments of the present invention concern the format of the assistance report or assistance information message, AIM, the way of transmitting the AIM from the UE-A to the UE-B and the format of the message itself.

--------AIM Contents=Resource Allocation Related Assistance Information--------

In accordance with embodiments of the present invention, the assistance provided by the inter-UE coordination is in the form of a set of resources that are determined by a first UE, like UE-A, to be available and/or not available for by a second UE, like UE-B, and a corresponding report, referred to as an assistance information message, is sent to the UE-B which, in turn, uses the report to decide the transmission resources the UE-B uses for a transmission over the sidelink, e.g., to UE-C. For example, UE-A may determine from a set of sidelink resources or from a sidelink resource pool of the wireless communication system a set of resources that are available and/or unavailable for usage by UE-B, and send to UE-B one or more AIMs including the determined set of resources, so as to allow the UE-B to decide transmission resources to be used.

In accordance with embodiments the resource allocation related assistance information includes one or more of the following:

one or more receive resource pools to be used by the further UE, one or more transmit resource pools to be used by the further UE, one or more exceptional resource pools to be used by the further UE, e.g., a resource pool to be used during handover, HO, procedures, one or more resources within a resource pool to be used for transmission by the further UE to another further UE, for periodic transmissions e.g., semi-persistent transmissions, or for aperiodic transmissions, e.g., one-shot transmissions, one or more bandwidth parts, BWPs, to be used by the further UE, interference information, e.g., RSRQ or SINR reports, a resource pool congestion status, e.g., a CBR measurement report, a sensing report, e.g., a zonal area resource usage map, ZARUM.

The AIM may indicate a resource set to be used by UE-B in any one of the following manners:

by a list of all resource blocks, RBs, that are available in one or more time slots, by a list of all resource blocks, RBs, that are unavailable in one or more time slots, by a list of resource blocks, RBs, for which collisions are expected, e.g., a list of reserved resources where the further UE is expected to transmit as well.

The AIM may indicate the resource across time in any one of the following manners:

by a bitmap across time, the bitmap indicating resources, like OFDM symbols or time slots or subframes or frames, where the resource set is defined, spanning either a portion or the entire length of the one BWP, by a starting resource, like a time slot or a subframe, and a duration of the resource set, by explicit resources numbers, like time slot or subframe numbers, by puncturing out resources mentioned explicitly or that are part of another set of resources or RP, by a starting resource, and periodic offsets for subsequent occurrences, by a pattern of symbols, time slots or subframes or frames.

The AIM may indicate the resource across frequency in any one of the following manners:

by a bitmap, the bitmap the bitmap indicating resources, like resource blocks, across the one BWP, by a starting resource, like a resource block, and a number of resources for a resource set, by multiple starting resources, like resource blocks, and ending resources, if the resource set is non-contiguous over frequency, by explicit resource indices, like resource block indices, by puncturing out resources mentioned explicitly or that are part of another set of resources or RP, by a starting resource, and periodic offsets for subsequent occurrences, by a pattern of resource blocks or subchannels, In accordance with embodiments, the AIM indicates the resources across time and frequency in any one of the following manners:

by a matrix, the matrix indicating the resources across time, like symbols, time slots or subframes or frames, and across frequency, like resource blocks or subchannels, by a pattern, the pattern indicating the resources across time, like symbols, time slots or subframes or frames, and across frequency, like resource blocks or subchannels.

For example, the matrix mentioned above may include a set of vectors or may be a matrix in dense or sparse representation. The number of time slots may be variable and may be defined using a parameter that indicates a duration of the AIM.

In accordance with embodiments, UE-A may determine the set of resources that are available and/or unavailable for use by UE-B by sensing operations in the sidelink resource pool of the wireless communication system, for example, in case the UE-A is also an out-of-coverage UE, i.e., obtains no assistance from a gNB with regard to the resource allocation for a communication over the sidelink. In accordance with other embodiments, UE-A may be in-coverage and obtain the resources to be included into the AIM directly from the gNB or indirectly from the gNB via a relay, e.g., in case UE-A is in Mode 2 or in- or out-of-coverage.

In accordance with further embodiments, there may be different types of assistance information messages, AIMs, for assisting UE-B in its resource allocation, and the UE-A may transmit one or more of the AIMs to the UE-B. In accordance with embodiments, the AIMs may be based on a type of a sidelink resource pool. The AIMs in accordance with embodiments of the present invention are intended for out-of-coverage UEs, for example, for Mode 2 UEs, and a plurality of sidelink resource pools may exist. UE-A may send only an AIM including resources of one of the resource pools, or for two or more or all of the plurality of resource pools, where each AIM contains resources pertaining to a single or a plurality of resource pools.

In accordance with embodiment, the plurality of resource pools includes a first resource pool providing resources for a feedback channel over the sidelink, like the PSFCH, and a second resource pool providing no resources for a feedback channel over the sidelink, or resources pools of different QoS levels, or resources pools of different priority levels, or resources pools of different communication types, like unicast, multicast or groupcast, or broadcast, or one or more transmit pools and one or more receive pools or one or more exceptional pools.

In accordance with other embodiments, the AIMs may be associated with or based on priority levels. For example, when the UE-A carries out sensing, it may compare the sidelink reference signal received power, SL-RSRP, on a given resource against a predefined RSRP threshold based on a priority of an intended transmission as well as based on the on the priority of a received transmission on the given resource. UE-A may categorize the available resources based on the priority levels that may be transmitted using the resources, and based on the categorization, different AIMs pertaining to each of the priority levels may be transmitted to the UE-B. In other words, the RSRP threshold may be selected based on two aspects, the priority of the transmission which the UE intends to transmit, and the priority of the received transmission on the said resource, which is indicated in the received SCI.

--------AIM Contents=Link Related Assistance Information--------

In accordance with embodiments of the present invention, the assistance provided by the inter-UE coordination is in the form of link related assistance information. In this type of AIM, UE-A essentially provides link information between UE-B and UE-C, which includes one or more of the following:

- link quality information, e.g., a report including quality information about a link between one further UE (UE-B) and another further UE (UE-C),
- beamforming information, e.g., a Sounding Reference Signal, SRS, or a SRS Resource Indicator, SRI,
- transmit power-related information, e.g., the maximum allowed transmit power in a given transmit resource pool, to be included in a power control algorithm,
- timing information, e.g., for time alignment or synchronization, e.g., for use when a UE is in DRX and wakes up, so the UE may use the timing information to adjust its timing without waiting for a GPS signal.

--------AIM Contents=Distance Related Assistance Information--------

In accordance with embodiments of the present invention, the assistance provided by the inter-UE coordination is in the form of distance related assistance information. This information is the distance between UE-B and UE-C or relative distance of UE-B and UE-C to UE-A, which UE-B may utilize for one or more of the following:

- a minimum required communication range for a communication between one further UE (UE-B) and another further UE (UE-C), e.g., to determine whether the further UE is to send a HARQ feedback or not,
- a physical distance between one further UE and another further UE, e.g., to determine the transmission power to be used,
- a zone ID or a list of zone IDs, relating to the geographical position of one further UE and/or other further UEs, e.g., to be used to optimize transmission power or feedback procedures, e.g., HARQ, or to select links for communication.

--------AIM Contents=Geographical Area Related Assistance Information--------

In accordance with embodiments of the present invention, the assistance provided by the inter-UE coordination is in the form of geographical area related assistance information. This information is typically the location of UE-C and other UEs, which may help UE-B to assess its neighboring UEs. This information includes one or more of the following:

- geographical information, e.g., GPS coordinates,
- path tracking information, e.g., to inform the further UEs about the direction and speed of the UE, and also to provide tracking area update (TAU) messages that include a tracking area identifier (TAI) and a tracking area code (TAC),
- route information, e.g., to inform the further UEs about the potential exit of the UE from a platoon,
- a zone ID or a list of zone IDs, relating to the geographical position of one further UE and/or other further UEs, e.g., to be used to optimize transmission power or feedback procedures, e.g., HARQ, or to select links for communication.

--------AIM Contents=Group Related Assistance Information--------

In accordance with embodiments of the present invention, the UEs, like UE-A and UE-B are part of a group of UEs, and the assistance provided by the inter-UE coordination is in the form of group related assistance information. These AIMs may assist UE-B with information regarding advanced group management, the content of which includes one or more of the following:

- an identification of the group, e.g., a group ID,
- an identification of a group leader, e.g., a group leader ID,
- an identification of one or more group members, e.g., a group member ID,
- configuration information, e.g., resource pool information indicating resources to be used for a communication within the group,
- transmission related information, e.g., transmission parameters to be used for group communication, e.g., modulation and coding scheme, MCS, transmit power, timing advance, TA, HARQ operation,
- a list of group members,
- trajectory information of the group members, e.g., to determine a possibility of a UE leaving the group,
- a distance between member UEs or other distance-related information like a vector with zone IDs, e.g., to determine whether to send HARQ feedback or not,
- resources to be used for transmission within the resource pool,
- information regarding an addition or a removal of one or more member UEs to or from the group.

--------AIM Contents=Relay Related Assistance Information--------

In accordance with embodiments of the present invention, the assistance provided by the inter-UE coordination is in the form of relay related assistance information. In these types of AIMs, UE-A provides information to UE-B pertaining to its functioning with the presence of a relay node, which includes one or more of the following:

- one or more relay UEs,
- a capacity of one or more relay UEs,
- a transmission mode of one or more relay UEs,
- an identification of one or more relay UEs, like a relay UE ID,
- a selected relay UE,
- one or more candidate relay UEs,
- a capacity of a set of one or more candidate relay UEs,
- a transmission mode of one or more candidate relay UEs,
- a distance and/or path information of one or more candidate relay UEs.

--------Transmitting the AIM--------

In accordance with embodiments, various approaches for transmitting the one or more AIMs may be employed.

In accordance with a first embodiment, UE-A, which intends to assist UE-B, may transmit the one or more AIMs in accordance with a first method using a configuration message, for example, using PC5 RRC signaling or a PC5 RRC configuration message or a MAC CE. The transmission may be in a unicast, groupcast/multicast or broadcast manner.

Figure 8:
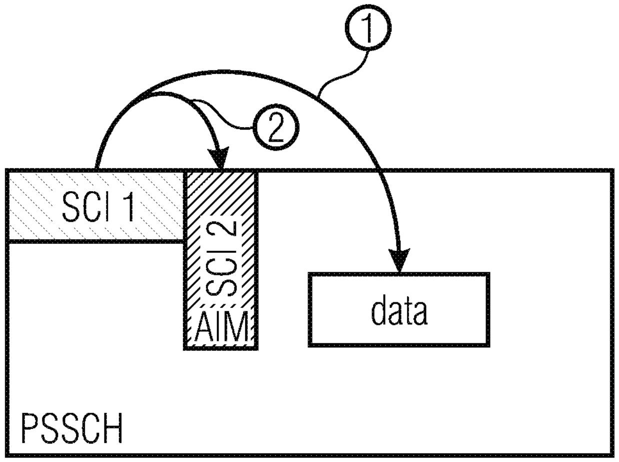
FIG. 8 illustrates transmitting an assistance information message, AIM, as part of a control message, in accordance with embodiments of the present invention.

In accordance with a second embodiment, UE-A, which intends to assist UE-B, may transmit the one or more AIMs in accordance with a second method as part of a control message, for example, as part of the sidelink control information, SCI. FIG. 8 illustrates an embodiment of such a SCI format. A first stage SCI, SCI1, is received in the physical sidelink shared channel, PSSCH, and indicates ① where data for the UE-B may be found in the PSSCH, and ② that the AIM is contained within a second stage SCI, SCI2. The indication of ② may be carried out by providing the second stage SCI format number in the first stage SCI, using the parameter 2nd-stage SCI format, that corresponds to a second stage SCI format that supports the content of the AIM. Thus, SCI1 points UE-B to the resources in the PSSCH at which the second stage SCI2 is transmitted, and SCI2 contains, in addition to further information by the UE-B for decoding data in the PSSCH, also the AIM including the above described information, like available/ unavailable resources the UE-B may use for a further transmission to another UE, like UE-C in FIG. 7.

Figure 9:
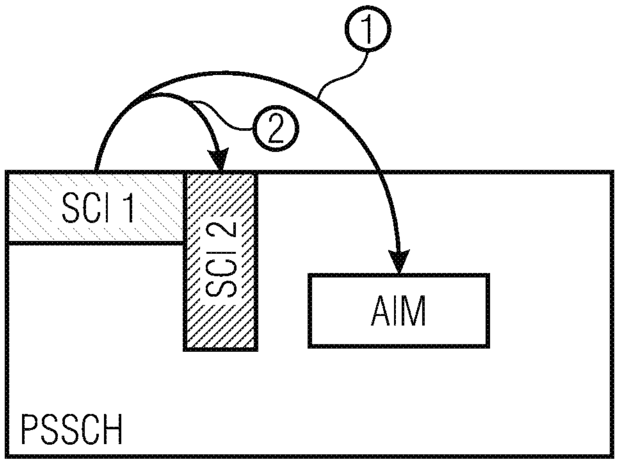
FIG. 9 illustrates a SCI format using a two stage SCI format indicting where an assistance information message, AIM, as may be found in a PSSCH, in accordance with embodiments of the present invention.

In accordance with other embodiments of the second method, rather than introducing an additional second stage SCI format to be indicated in the first stage SCI for the transmission of the AIM, also existing formats may be employed. FIG. 9 illustrates an embodiment of such a SCI format using a two stage SCI format. SCI1 is received in the physical sidelink shared channel, PSSCH, and indicates ① where the AIM for the UE-B may be found in the PSSCH, and ② where the second stage SCI2 may be found in the PSSCH.

In accordance with further embodiments, the beta_offset_indicator in an existing SCI format may be used as an indicator for additional control and/or data. For example, the beta_offset_indicator in the first stage SCI may be set to a certain value so as to indicate the presence of the AIM in the data section of the transmission. Conventionally, the beta_offset_indicator indicates the size of control data that may be found in the data region. This may include the size of the AIM. Thus, when the AIMs employed for forwarding the above mentioned information have different sizes and the presence of an AIM, e.g., as part of a second stage SCI or as additional control information in the data section, is indicated by the first stage SCI and/or second stage SCI and/or higher layer signaling, the beta_offset_indicator in a first stage SCI may be set to a certain value indicating the presence and/or size of the AIM in a second stage SCI and/or in the PSSCH.

Figure 10:
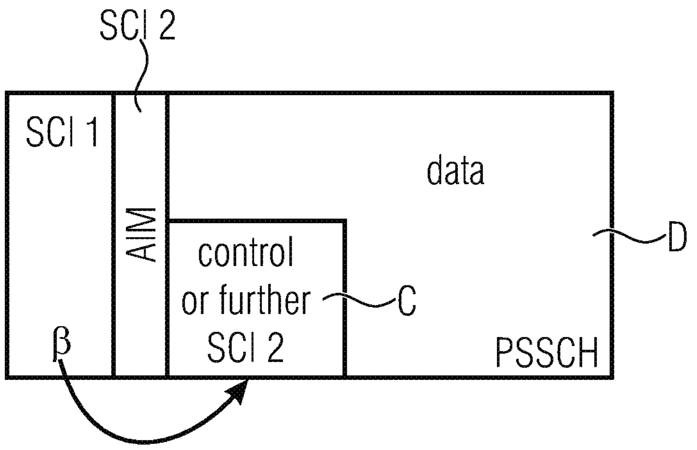
FIG. 10 illustrates a SCI format used for transmitting an assistance information message, AIM, in accordance with embodiments of the present invention.

However, when the AIMs have a fixed size and the presence of an AIM, e.g., as part of a second stage SCI or as additional control information, or an additional second stage SCI, in the data section, is indicated by the first stage and/or second stage SCI and/or higher layer signaling, the beta_offset_indicator in a first stage SCI may be set to a certain value indicating the size only of the control information other than the AIM in the PSSCH, e.g., link reports, or a second 2$^{nd}$ stage SCI. FIG. 10 illustrates an embodiment of such a SCI format using a first stage SCI format and two second stage SCI formats. SCI1 is received in the physical sidelink shared channel, PSSCH, and the AIM, having a fixed size, is transmitted as a part of the PSSCH as a second stage control information, SCI2. Further, SCI1 indicates ①, by means of the beta_offset_indicator, β, the size of the control information C, like control data or a further second stage SCI, further SCI2, in the data region D of the PSSCH. The control information C indicates ② where data for the UE-B may be found in the PSSCH.

In accordance with other embodiments of the second method, a first stage or second stage SCI may contain a new parameter that informs UE-B about the presence of the AIM in the corresponding data transmission.

Figure 11:
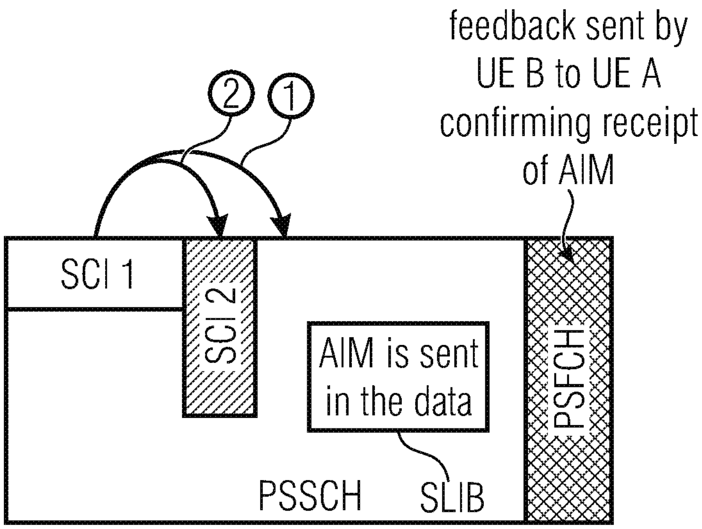
FIG. 11 illustrates transmitting an assistance information message, AIM, as a part of a data transmission using an information block on resources of the PSSCH indicated in a control message transmitted for the information block, in accordance with embodiments of the present invention.

In accordance with a third embodiment, UE-A, which intends to assist UE-B, may transmit the one or more AIMs in accordance with a third method as a part of a data transmission, which is indicated by parameters in the accompanying control message, like a SCI. The unique aspect of this embodiment is that the AIM is transmitted as an information block, and is transmitted as if it were a data transmission. For example, UE-A may transmit the one or more sidelink information blocks, SLIBs, as a normal data transmission with a feedback enabled, and UE-B provides feedback to UE-A depending on whether or not the SLIB was successfully received. Transmitting the SLIB as a normal data transmission is advantageous as the size of the second stage SCI may be kept at a minimum, and it provides UE-A with the flexibility to inform UE-B about the SLIB on an ad-hoc basis. FIG. 11 illustrates an embodiment of transmitting the one or more AIMs as a part of a data transmission using a SLIB in the PSSCH. UE-B receives a two stage SCI including the first stage SCI1 indicating ① the second stage SCI2 and further indicating ② on what resources the data, which is the AIM for the UE-B, in form of the SLIB, may be found in the PSSCH. The PSFCH is enabled so as to allow the UE-B to send the feedback to the UE-A for confirming receipt of the AIM.

Figure 12:
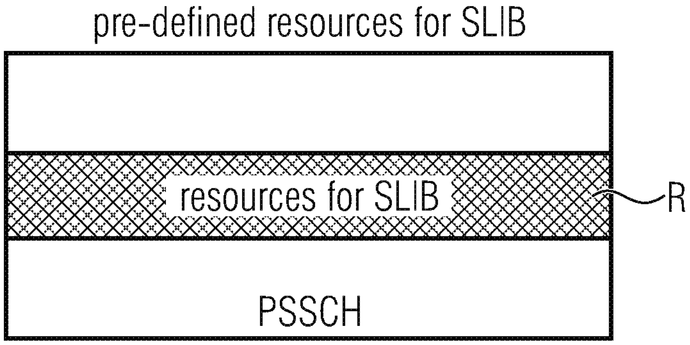
FIG. 12 illustrates transmitting an assistance information message, AIM, as a part of a data transmission using an information block on pre-defined resources of the PSSCH, in accordance with embodiments of the present invention.

In accordance with a fourth embodiment, UE-A, which intends to assist UE-B, may transmit the one or more AIMs in accordance with a fourth method as an information block, e.g., in the PSSCH or the resource pool as a sidelink information block, SLIB. Thus, rather than signaling the resources to be used for the transmission of the SLIB using, for example, the SCI as explained above with reference to FIG. 11, predefined resources may be employed. In other words, the resources to be used for the transmission of the AIMs that include the SLIBs, may be indicated, e.g., in the SIB or MIB, as a global function, and a UE, like UE-B, is aware of the resources within the PSSCH or within the entire resource pool where the SLIBs are transmitted. This may be also referred to as a SLIB search space and avoids the need to transmit additional control information for the SLIB, like the SCI, since the resource location is already indicated in the relevant SIB or MIB. FIG. 12 illustrates an embodiment of transmitting the one or more AIMs as an information block. In the PSSCH certain resources R are pre-defined or reserved to be used for the transmission of the SLIB, and UE-B is informed about the resources R via the SIB or MIB.

--------Transmitting the AIM at Certain Time Instances--------

In accordance with embodiments of the present invention, the one or more AIMs may be transmitted at certain time instances. The UE-A may send the one or more AIMs at specific instances of time, e.g., using one of the above described approaches for transmitting the AIM.

In accordance with embodiments, UE-A may transmit the one or more AIMs at periodic intervals. For example, UE may transmit the one or more AIMs using a configuration message, like a PC5 RRC configuration message or a MAC CE, in a unicast, multicast or broadcast manner, i.e., in accordance with the above described first embodiment for transmitting the one or more AIMS. In accordance with other examples, the UE may transmit the one or more AIMs as an information block, wherein the resources used for the transmission of the information block, like a SLIB, i.e., in accordance with the above described fourth embodiment for transmitting the one or more AIMS.

In accordance with other embodiments, the UE-A may transmit the one or more AIMs based on an implicit event. Responsive to the event, UE-A may transmit the one or more AIMs aperiodically, e.g., once following the event, or UE-A may transmit the one or more AIMs periodically, like n-times for a specified time period to increase reliability, e.g., due to the half-duplex issue, and to ensure the AIM is received. In accordance with embodiments, the above-described first to third embodiments for transmitting the AIM may be employed for sending the AIMs.

An implicit event may refer to consecutive packet collisions. In case UE-A detects that there is a possibility of consecutive packet collisions for a transmission to be carried out by UE-B, UE-A may provide an AIM for this purpose. For example, UE-A may detect the potential of collisions by listening to the SCIs being transmitted by other UEs. The SCIs contain not only current resource locations of a transmission, but also resource locations for future transmissions, for example, for up to two further future transmissions. When UE-A recognizes from the SCIs that they point to the same future transmission resources that also UE-B intends to use, UE-A may provide an AIM to UE-B in order to counter this. In other words, the AIM may be created on the basis of the current resources, the future resources and the intended resources. This addresses a situation of the UE-B not being able to receive the transmissions of the SCIs from other UEs, since it transmitted its own SCI at that time and, due to the half-duplex issue, missed the other SCIs.

In accordance with other embodiments, the implicit event may be based on a channel busy ratio, CBR, threshold. The CBR may be measured for the sidelink resource pool for indicating the congestion or occupancy of the resources. In case the CBR measured hits a predefined threshold of occupancy, UE-A may send an AIM including the remaining available resources in the given resource pool. In accordance with embodiments, such an AIM may be sent only for resource pools having PSFCH enabled, as the resource pool with such high-quality resources is basically only used for high reliability transmissions.

Further examples for the implicit event may include one or more of the following:

- a link quality between the further UE and another further UE is below a pre-defined threshold, or
- a beamforming link has broken down between further UEs, or
- when the further UE is beyond a pre-defined communication range, or
- when another further UE enters or exits an existing group of further UEs, or
- a selection or reselection of a relay UE, e.g., when a link quality has gone below a pre-defined threshold, or
- when a UE is switched on or before being switched off or leaving a cell, or
- when a UE is detecting a change in resource pool configuration, or
- when a UE is entering a certain geographical area, or
- when a UE is within a certain distance of another UE or detects that another UE (UE-B) is within a certain distance of a further UE (UE-C).

In accordance with yet other embodiments, a time instance when the AIM is to be transmitted from the UE-A to the UE-B may be triggered by the UE-B. In other words, a transmission of the AIM may be performed on request by the UE-B. The UE-B may explicitly request the UE-A to send an AIM to assist UE-B with its resource allocation. The UE-B may request UE-A for an AIM, for example using a PC5 RRC or MAC CE signaling. Responsive to the request, UE-A may transmit the AIM to the UE-B in accordance with one of the above-described first to third embodiments for transmitting the AIM. Responsive to the request, UE-A may transmit the AIMs aperiodically, e.g., once following the request, or UE-A may transmit the AIMs periodically, like n-times for a specified time period to increase reliability.

In accordance with embodiments, UE-B may request the AIM in case it requires assistance in its resource allocation procedure. For example, such a need for assistance may arise in case of the transmission of packets that require a high reliability and/or a low latency and/or high priority. This is to ensure that the packet is received by the intended recipient at the first attempt in order to maintain the low latency requirement, and using resources that are available so as to avoid any potential resource collisions. Another situation in which the UE may require assistance is when the UE obtains inadequate or no sensing results. For example, in case UE-B was not able to obtain adequate sensing results during a handover so that it has not enough sensing results for deciding on resources to be used for the sidelink transmission, it may request an AIM from the UE-A. In accordance with other embodiments, UE-B may not have any sensing results at all, for example due to a radio link failure, RLF, or because it is operating in a DRX mode. Also, in this case, the UE-B may request from UE-A the AIM for obtaining resources for the sidelink transmission to be used by UE-B.

Further examples for UE-B to request for an AIM from UE-A may include one or more of the following:

- the UE's power level is below a pre-defined threshold,
- the UE wants to improve its power consumption by reducing sensing efforts and limit sensing to a pre-defined set of resources/resource pools,
- when the geo-fencing related information expires and requires an updated geo-fencing AIM,
- when the UE enters or exits an existing group of further UEs,
- when the link quality between the UE and a further UE deteriorates below a pre-defined threshold, and the UE requests for a relay UE for assistance.

--------AIMs in a Group--------

In accordance with other embodiments of the present invention, the one or more AIMs may be provided within a group. In case of groupcast communications, UE-A, which may be a group leader UE, may assist UE-B, which is a member UE of the group formed by UE-A, UE-B and potentially other UEs, by providing one or more AIMs. Thus, the one or more member UEs, like UE-B need not carry out operations, like sensing, to obtain the information, rather the information indicated in the AIM may be used for carrying out a transmission.

--------AIMs and Sensing Results--------

In accordance with the yet further embodiments of the present invention, a UE-B, that receives the AIM, may use the information included in the AIM together with its own sensing results, for example to fine-tune its resource selection process. This approach may be used when UE-B does not see certain UEs and their allocated resources, for example due to the near-far problem. In this situation, the respective resources of the invisible UEs are indicated in the AIM received from the UE-B. In accordance with embodiments, the UE-B may prioritize resources which, by its own sensing and by the AIM received from the UE-A, are expected to be free. The AIM may also indicate resources that are not to be used by UE-B for transmission to UE-C, and UE-B may use this information from the AIM to eliminate these resources during its sensing process. This type of reservation of resources via AIM may be utilized in case resource have to be reserved for high priority services or for emergency services.

--------AIM Propagation and Global Consistency--------

Further embodiments of the present invention relate to the AIM propagation and global consistency. In accordance with such embodiments, procedures are provided to ensure that the assistance information is consistent for a plurality of UEs. Consistency means that the parameters defined in the AIM are reliably applied for all relevant UEs in space as well as in time. For example, parameters in the one or more AIMs may change dependent on the geographical area the UE is operating in, and an AIM may be applied only within a certain geographical area. Also, the one or more AIMs may change over time so that they may be applied only during a certain time period. Also switching between parameters defined in the one or more AIMs may be required to happen for all UEs at the same time, for example, in case the parameters are not compatible.

In accordance with embodiments, an AIM may have associated therewith a geographical area within which the AIM is valid. This means that when a UE is leaving the geographical area, the AIM needs to be disabled or refreshed.

In accordance with other embodiments, the one or more AIMs may have associated therewith an activation time. This allows the AIM to be transmitted multiple times to make sure that all receiving UEs successfully receive the AIM before it is actually activated. This may be applied when the AIM changed and needs to be updated at multiple UEs.

In accordance with yet further embodiments, an AIM may expire or may be missing, in response to such a situation, the UE may trigger an AIM request message. This may be done using a unicast or multicast/groupcast communication or a broadcast communication.

General

Embodiments of the present invention have been described in detail above, and the respective embodiments and aspects may be implemented individually or two or more of the embodiments or aspects may be implemented in combination.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, the user device, UE, described herein may be one or more of a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and requiring input from a gateway node at periodic intervals, or a mobile terminal, or a stationary terminal, or a cellular IoT-UE, or a vehicular UE, or a vehicular group leader (GL) UE, or an IoT, or a narrowband IoT, NB-IOT, device, or a WiFi non Access Point STAtion, non-AP STA, e.g., 802.11ax or 802.11be, or a ground based vehicle, or an aerial vehicle, or a drone, or a moving base station, or a road side unit, or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

The base station, BS, described herein may be implemented as mobile or immobile base station and may be one or more of a macro cell base station, or a small cell base station, or a central unit of a base station, or a distributed unit of a base station, or a road side unit, or a UE, or a group leader (GL), or a relay, or a remote radio head, or an AMF, or an SMF, or a core network entity, or mobile edge computing entity, or a network slice as in the NR or 5G core context, or a WiFi AP STA, e.g., 802.11ax or 802.11be, or any transmission/reception point, TRP, enabling an item or a device to communicate using the wireless communication network, the item or device being provided with network connectivity to communicate using the wireless communication network.

Embodiments concern the following types of UEs communicating over a sidelink PC5:

- Vulnerable road users, VRUs, like pedestrian UEs, P-UEs: these UEs are basically hand-held UEs used by pedestrians, like mobile phones. The UE may transmit its location periodically to vehicular UEs, V-UEs, so that these V-UEs are aware of the UE's location. The V-UEs may receive a transmission from the UE in case they are in proximity and that there is a possibility of a collision.
- Public safety UEs, PS-UEs: such UEs may be on-body or hand-held UEs used by public safety personnel and first responders, like policemen, paramedics and firemen. The PS-UEs use both transmit and receive functionality at all times.
- IoT-UEs: these UEs may include sensors in a sensor network, actuators or other low power nodes or powered relay and/or processing nodes.
- Industrial IoT-UEs: these UEs may be devices in a closed campus network designed to carry out certain tasks and obtaining inputs from a gateway node at periodic intervals. Examples for IoT-UEs are robots on a factory floor carrying out repetitive tasks.

Embodiments of the inventive approach are described for sidelink communications in the context of cellular communication systems, safety communication systems, campus networks. The present invention is not limited to this, rather, in accordance with further embodiments, the inventive approach may be employed in any kind of communication network, e.g., an ad-hoc communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 13:
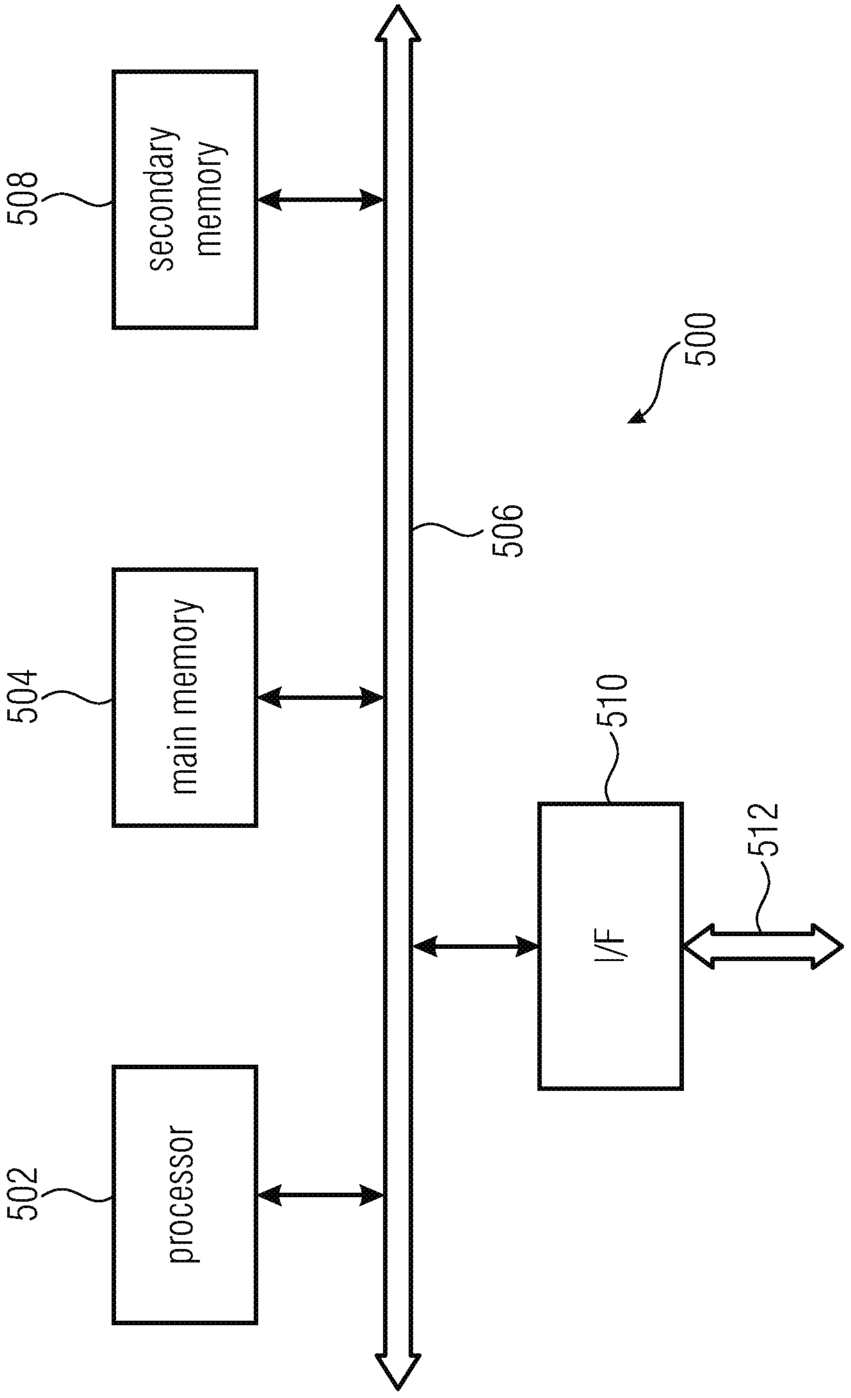
FIG. 13 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 13 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A user device, UE, for a wireless communication system, the wireless communication system comprising a plurality of user devices, UEs, the user device comprising:

one or more antennas, and a transceiver, wherein, using the one or more antennas and the transceiver, the UE communicates with one or more further UEs using a sidelink, SL, interface, wherein, using the one or more antennas and the transceiver, the UE sends to the further UE one or more resource allocation related assistance information messages, resource allocation related AIMs, indicating resources to be used by the further UE, wherein, using the one or more antennas and the transceiver, the UE sends or transmits the one or more resource allocation related AIMs as a part of a data transmission, wherein a transmission of the one or more resource allocation related AIMs as part of the data transmission is indicated by an indication in a control message, and wherein the indication in the control message comprises one of the following:

an indicator in a first stage SCI, the indicator indicating a presence of or a presence and a size of one or more resource allocation related AIMs in a Physical Sidelink Shared Channel (PSSCH), a parameter to be set by the UE in a first stage SCI or second stage SCI for indicating a presence of the one or more resource allocation related AIMs in a Physical Sidelink Shared Channel (PSSCH).

2. The user device, UE, of claim 1, wherein the resources to be used by the further UE are in the form one or more of the following:

one or more receive resource pools to be used by the further UE, one or more transmit resource pools to be used by the further UE, one or more exceptional resource pools to be used by the further UE, one or more resources within a resource pool to be used for transmission by the further UE to another further UE, for periodic transmissions, or for aperiodic transmissions, one or more bandwidth parts, BWPs, to be used by the further UE, interference information, a resource pool congestion status, a sensing report.

3. The user device, UE, of claim 1, wherein the UE is to determine from a set of sidelink resources or from a sidelink resource pool of the wireless communication system a set of resources that are available or unavailable for usage by one or more of the further UEs, and the UE is to send to the further UE one or more resource allocation related AIMs comprising the determined set of resources, so as to allow the further UE to decide the transmission resources to be used.

4. The user device, UE, of claim 1, wherein the resource allocation related AIM comprises resources to be used by the further UE for a transmission to one or more other further UEs, the other further UE being different from the UE.

5. The user device, UE, of claim 1, wherein the UE is configured or pre-configured with one or more resource pools to be used for sidelink communications, and wherein the UE is to send the resource allocation related AIM in one or more of the following ways:

send only a resource allocation related AIM comprising resources of one of the resource pools, send a resource allocation related AIM comprising resources of two or more or all of the plurality of resource pools, wherein each resource allocation related AIM comprises resources pertaining to a single or a plurality of resource pools.

6. The user device, UE, of claim 5, wherein the plurality of resource pools comprises any combination of one or more of the following resource pools:

a first resource pool providing resources for a feedback channel over the sidelink, and a second resource pool providing no resources for a feedback channel over the sidelink, resources pools of different QoS levels, resources pools of different priority levels, resources pools of different communication types, one or more transmit pools, one or more receive pools, one or more of exceptional pools.

7. The user device, UE, of claim 1, wherein the resource allocation related AIM indicates a resource set to be used by the further UE in any one of the following manners:

by a list of all resource blocks, RBs, that are available in one or more time slots, by a list of all resource blocks, RBs, that are unavailable in one or more time slots, by a list of resource blocks, RBs, for which collisions are expected.

8. The user device, UE, of claim 7, wherein the resource allocation related AIM indicates the resource across time in any one of the following manners:

by a bitmap across time, the bitmap indicating resources, where the resource set is defined, spanning either a portion or the entire length of the one BWP, by a starting resource, and a duration of the resource set, by explicit resources numbers, by puncturing out resources mentioned explicitly or that are part of another set of resources or RP, by a starting resource, and periodic offsets for subsequent occurrences, by a pattern of symbols, time slots or subframes or frames, or the resource allocation related AIM indicates the resource across frequency in any one of the following manners:

by a bitmap, the bitmap the bitmap indicating resources across the one BWP, by a starting resource, and a number of resources for a resource set, by multiple starting resources, and ending resources, if the resource set is non-contiguous over frequency, by explicit resource indices, by puncturing out resources mentioned explicitly or that are part of another set of resources or RP, by a starting resource, and periodic offsets for subsequent occurrences, by a pattern of resource blocks or subchannels, or the resource allocation related AIM indicates the resources across time and frequency in any one of the following manners:

by a matrix, the matrix indicating the resources across time, and across frequency, by a pattern, the pattern indicating the resources across time, and across frequency.

9. The user device, UE, of claim 1, wherein the UE is to transmit the one or more resource allocation related AIMs in one or more of the following methods:

at periodic intervals, or responsive to a request by the further UE, or responsive to one or more implicit events.

10. The user device, UE, of claim 9, wherein, when transmitting the one or more resource allocation related AIMs responsive to one or more implicit events, the UE is to automatically send the one or more resource allocation related AIMs to the further UE, when a certain event occurs.

11. The user device, UE, of claim 10, wherein the certain event comprises one or more of the following:

when the UE detects that there is a possibility of consecutive packet collisions for a transmission which is to be carried out by the further UE, or an occupancy of the sidelink resource pool reaches a threshold, or a link quality between the further UE and another further UE is below a pre-defined threshold, or a beamforming link has broken down between further UEs, or when the further UE is beyond a pre-defined communication range, or when another further UE enters or exits an existing group of further UEs, or a selection or reselection of a relay UE, or when a UE is switched on or before being switched off or leaving a cell, or when a UE is detecting a change in resource pool configuration, or when a UE is entering a certain geographical area, or when a UE is within a certain distance of another UE or detects that another UE (UE-B) is within a certain distance of a further UE.

12. The user device, UE, of claim 11, wherein, to detect a possibility of consecutive packet collisions, the UE is to listen to control messages being transmitted by other UEs on the sidelink, the control message comprising not only current resources of a transmission, but also resources of one or more future transmissions, and determine, using a control message from the further UE, resources of intended transmissions that are scheduled to occur in the same set of resources, and using the resources of the current, future and intended transmissions, to determine the resource allocation related AIM in order to avoid the further UE from transmitting in these resources.

13. The user device, UE, of claim 1, wherein, the UE and one or more of the further UEs form a UE group, and the UE is to assist one or more of the other group members by providing the one or more resource allocation related AIMs such that one or more of the other group members need not carry out sensing.

14. A wireless communication system, comprising:

a plurality of user devices, UEs, configured for a sidelink communication using resources from a set of sidelink resources of the wireless communication system, wherein one or more of the plurality of UEs comprise:

one or more antennas, and a transceiver, wherein, using the one or more antennas and the transceiver, the UE communicates with one or more further UEs using a sidelink interface, SL, and sends to the further UE one or more resource allocation related assistance information messages, resource allocation related AIMs, indicating resources to be used by the further UE, wherein, using the one or more antennas and the transceiver, the UE sends or transmits the one or more resource allocation related AIMs as a part of a data transmission, wherein a transmission of the one or more resource allocation related AIMs as part of the data transmission is indicated by an indication in a control message, and wherein the indication in the control message comprises one of the following:

an indicator in a first stage SCI, the indicator indicating a presence of or a presence and a size of one or more resource allocation related AIMs in a Physical Sidelink Shared Channel (PSSCH), a parameter to be set by the UE in a first stage SCI or second stage SCI for indicating a presence of the one or more resource allocation related AIMs in a Physical Sidelink Shared Channel (PSSCH).

15. The wireless communication system of claim 14, comprising one or more base stations, wherein the base station comprises one or more of a macro cell base station, or a small cell base station, or a central unit of a base station, or a distributed unit of a base station, or a road side unit, or a UE, or a group leader, or a relay or a remote radio head, or an AMF, or an SMF, or a core network entity, or mobile edge computing entity, or a network slice as in the NR or 5G core context, or any transmission/reception point, TRP, enabling an item or a device to communicate using the wireless communication network, the item or device being provided with network connectivity to communicate using the wireless communication network.

16. A method for operating a user device, UE, of a wireless communication system comprising a plurality of user devices, UEs, the method comprising:

operating the UE to communicate with one or more further UEs using a sidelink, SL, interface, and sending, by the UE, to the further UE one or more resource allocation related assistance information messages, resource allocation related AIMs, indicating resources to be used by the further UE, wherein the UE sends or transmits the one or more resource allocation related AIMs as a part of a data transmission, wherein a transmission of the one or more resource allocation related AIMs as part of the data transmission is indicated by an indication in a control message, and wherein the indication in the control message comprises one of the following:

an indicator in a first stage SCI, the indicator indicating a presence of or a presence and a size of one or more resource allocation related AIMs in a Physical Sidelink Shared Channel (PSSCH), a parameter to be set by the UE in a first stage SCI or second stage SCI for indicating a presence of the one or more resource allocation related AIMs in a Physical Sidelink Shared Channel (PSSCH).

17. A non-transitory digital storage medium having stored thereon a computer program for performing, when said computer program is run by a computer, a method for operating a user device, UE, of a wireless communication system comprising a plurality of user devices, UEs, the method comprising:

operating the UE to communicate with one or more further UEs using a sidelink, SL, interface, and sending, by the UE, to the further UE one or more resource allocation related assistance information messages, resource allocation related AIMs, indicating resources to be used by the further UE, wherein the UE sends or transmits the one or more resource allocation related AIMs as a part of a data transmission, wherein a transmission of the one or more resource allocation related AIMs as part of the data transmission is indicated by an indication in a control message, and wherein the indication in the control message comprises one of the following:

an indicator in a first stage SCI, the indicator indicating a presence of or a presence and a size of one or more resource allocation related AIMs in a Physical Sidelink Shared Channel (PSSCH), a parameter to be set by the UE in a first stage SCI or second stage SCI for indicating a presence of the one or more resource allocation related AIMs in a Physical Sidelink Shared Channel (PSSCH).

* * * * *